(12) United States Patent
Koesdjojo et al.

(10) Patent No.: US 8,999,265 B2
(45) Date of Patent: Apr. 7, 2015

(54) BONDING AGENT AND DEVICE FOR USE IN MICROFLUIDICS

(75) Inventors: Myra T. Koesdjojo, Corvallis, OR (US); Vincent T. Remcho, Corvallis, OR (US); Jintana Nammoonnoy, Corvallis, OR (US)

(73) Assignee: State of Oregon acting by and through the State Board of Higher Education on behalf of Oregon State University, Corvallis, OR (US)

( * ) Notice: Subject to any disclaimer, the term of this patent is extended or adjusted under 35 U.S.C. 154(b) by 19 days.

(21) Appl. No.: 13/569,723

(22) Filed: Aug. 8, 2012

(65) Prior Publication Data

US 2013/0064713 A1     Mar. 14, 2013

Related U.S. Application Data

(60) Provisional application No. 61/522,060, filed on Aug. 10, 2011.

(51) Int. Cl.
*C08G 63/08* (2006.01)
*B32B 37/12* (2006.01)
(Continued)

(52) U.S. Cl.
CPC ............... *C08G 63/08* (2013.01); *B32B 37/12* (2013.01); *C09J 7/02* (2013.01); *C09J 167/04* (2013.01); *B01L 3/50255* (2013.01); *B01L 3/502707* (2013.01); *B01L 3/502738* (2013.01); *B29C 65/5057* (2013.01); *B29C 66/112* (2013.01); *B29C 66/1122* (2013.01); *B29C 66/114* (2013.01); *B29C 66/919* (2013.01); *B29C 65/48* (2013.01); *B29C 66/53247* (2013.01); *B29C 66/53461* (2013.01); *F16K 99/0025* (2013.01); *F16K 99/0065* (2013.01); *B29C 66/91411* (2013.01); *B29C 65/4815* (2013.01); *B29C 65/4835* (2013.01); *B29C 65/4845* (2013.01); *B29C 65/521* (2013.01); *B29L 2031/756* (2013.01); *B29C 66/929* (2013.01); *B01L 2200/027* (2013.01); *B01L 2200/0689* (2013.01); *B01L 2300/0816* (2013.01); *B01L 2300/0829* (2013.01); *B01L 2300/0861* (2013.01); *B01L 2300/0883* (2013.01);
(Continued)

(58) Field of Classification Search
None
See application file for complete search history.

(56) References Cited

U.S. PATENT DOCUMENTS

| 3,730,807 A * | 5/1973 | Smith et al. | 156/330.9 |
| 2003/0102080 A1* | 6/2003 | Mallik | 156/325 |

(Continued)

FOREIGN PATENT DOCUMENTS

WO     WO 2011/072715     *  6/2011     ............... B01L 3/00

OTHER PUBLICATIONS

Abgrall, P.; Low, L.N.; Nguyen, N.T. "Fabrication of planar nanofluidic channels in a thermoplastic by hot-embossing and thermal bonding." *Lab Chip* (2007) 7:520-522.

(Continued)

*Primary Examiner* — Jill Warden
*Assistant Examiner* — Timothy G Kingan
(74) *Attorney, Agent, or Firm* — Klarquist Sparkman, LLP

(57) ABSTRACT

Disclosed embodiments concern a microfluidic device comprising a bonding agent and two or more components. In particular disclosed embodiments, the microfluidic device is made out of the disclosed bonding agent. Also disclosed are embodiments of a method for making a microfluidic device, wherein the method includes using the disclosed bonding agent to couple two or more components together.

20 Claims, 18 Drawing Sheets

(51) Int. Cl.
| | |
|---|---|
| C09J 7/02 | (2006.01) |
| C09J 167/04 | (2006.01) |
| B01L 3/00 | (2006.01) |
| B29C 65/50 | (2006.01) |
| B29C 65/00 | (2006.01) |
| B29C 65/48 | (2006.01) |
| F16K 99/00 | (2006.01) |
| B29C 65/52 | (2006.01) |
| B29L 31/00 | (2006.01) |
| B29C 65/14 | (2006.01) |
| B29K 705/10 | (2006.01) |
| B29K 705/04 | (2006.01) |
| B29K 705/14 | (2006.01) |
| B29K 705/02 | (2006.01) |

(52) U.S. Cl.
CPC ... B01L 2300/0887 (2013.01); B01L 2300/165 (2013.01); B01L 2400/0688 (2013.01); B29C 65/1406 (2013.01); B29K 2705/10 (2013.01); B29K 2705/04 (2013.01); B29K 2705/14 (2013.01); B29C 66/71 (2013.01); B29C 66/73117 (2013.01); B29K 2705/02 (2013.01); B29C 66/91941 (2013.01)

(56) References Cited

U.S. PATENT DOCUMENTS

| | | | | |
|---|---|---|---|---|
| 2003/0220700 | A1* | 11/2003 | Hammer et al. | 623/23.58 |
| 2004/0037990 | A1* | 2/2004 | Abe et al. | 428/40.1 |
| 2008/0099064 | A1* | 5/2008 | Hayes | 136/251 |
| 2009/0181411 | A1* | 7/2009 | Battrell et al. | 435/7.92 |
| 2011/0207168 | A1 | 8/2011 | Kornev et al. | |
| 2011/0272644 | A1 | 11/2011 | Remcho et al. | |
| 2013/0146643 | A1* | 6/2013 | Schmid et al. | 227/180.1 |
| 2014/0106139 | A1* | 4/2014 | Abrams | 428/200 |
| 2014/0248471 | A1* | 9/2014 | Hanschen et al. | 428/189 |

OTHER PUBLICATIONS

Allo, B.A.; Rizkalla, A.S.; Mequanint, K. "Synthesis and electrospinning of ε-Polycaprolactone-bioactive glass hybrid biomaterials via a sol-gel process." *Langmuir* (2010) 26(23): pp. 18340-18348, and supporting information (4 pp.).

Armani, D.K.; Liu, C. "Microfabrication technology for polycaprolactone, a biodegradable polymer." *Journal of Micromechanical Microengineering* (2000) 10: pp. 80-84.

Becker, H.; Heim, U. "Hot embossing as a method for the fabrication of polymer high ratio structures." *Sensors and Actuators* (2000) 83:130-135.

"CapTite™ Microfluidic Interconnects." Aug. 9, 2012. labsmith.com, product page, downloaded Jul. 16, 2013.

Chen, Z.F.; Gao, Y.; Lin, J.; Sub, R.; Xie, Y.J. "Vacuum-assisted thermal bonding of plastic capillary electrophoresis microchip imprinted with stainless steel template." *Journal of Chromatography A* (2004) 1038:239-245.

Chen, Y.; Zhang, L.; Chen, G. "Fabrication, modification, and application of poly(methyl methacrylate) microfluidic chips." *Electrophoresis* (2008) 29:1801-1814.

Cheow, W.S.; Chang, M.W.; Hadinoto, K. "Antibacterial efficacy of inhalable antibiotic-encapsulated biodegradable polymeric nanoparticles against E. coli biofilm cells." *Journal of Biomedical Nanotechnology* (2010) 6: pp. 391-403.

Christensen, A.; Chang-Yen, D.; Gale, B.K. "Characterization of interconnects used in PDMS microfluidic systems." *Journal of Micromechanics and Microengineering* (2005) 15(5):928-934.

Chu, L.; Wang, J. "Comparison of polyurethane foam and biodegradable polymer as carriers in moving bed biofilm reactor for treating wastewater with a low C/N ratio." *Chemosphere* (2011) 83: pp. 63-68.

Dang, F.; Shinohara, S.; Tabata, O.; Yamaoka, Y.; Kurokawa, M.; Shinohara, Y.; Ishikawa, M.; Baba, Y. "Replica multichannel polymer chips with a network of sacrificial channels sealed by adhesive printing method." *Lab Chip* (2005) 5:472-478.

Davis, F.; Higson, S.P.J. "Carrier systems and biosensors for biomedical applications." Published in *Tissue Engineering Using Ceramics and Polymers*, A.R. Boccaccini and J. Gough authors, Woodhead Publishing Ltd., Oct. 31, 2007.

Esch, M.B.; Kapur, S.; Irizarry, G.; Genova, V. "Influence of master fabrication techniques on the characteristics of embossed microfluidic channels." *Lab Chip* (2003) 3(2):121-127.

Hu, W-W.; Elkasabi, Y.; Chen, H-Y.; Zhang, Y.; Lahann, J.; Hollister, S.J.; Krebsbach, P.H. "The use of reactive polymer coatings to facilitate gene delivery from poly(ε-caprolactone) scaffolds." *Biomaterials* (2009) 30: pp. 5785-8792.

"Interfacing of microfluidic devices." Chips and Tips, Feb. 27, 2009. rsc.org, blog, downloaded Jun. 27, 2013.

Ishida, A.; Yoshikawa, T.; Natsume, M.; Kamidate, T. "Reversed-phased liquid chromatography on a microchip with sample injector and monolithic silica column." *Journal of Chromatography A* (2006) 1132:90-98.

Jacobson, S.; Hergenröder, R.; Koutny, L.; Warmack, R.J.; Ramsey, J.M. "Effects of Injection Schemes and Column Geometry on the Performance of Microchip Electrophoresis Devices." *Analytical Chemistry* (1994) 66:1107-1113.

Kaigala, G.; Ho, S.; Penterman, R.; Backhouse, C. "Rapid prototyping of microfluidic devices with a wax printer." *Lab Chip* (2007) 7:384-387.

Kelly, R.T.; Woolley, A.T. "Thermal Bonding of Polymeric Capillary Electrophoresis Microdevices in Water." *Analytical Chemistry* (2003) 75:1941-1945.

Khang, D-Y.; Lee, H.H. "Room-temperature imprint lithography by solvent vapor treatment." *Applied Physics Letters* (2000) 76:870.

Kho, K.; Cheow, W.S.; Lie, R.H.; Hadinoto, K. "Aqueous re-dispersibility of spray-dried antibiotic-loaded polycaprolactone nanoparticle aggregates for inhaled anti-biofilm therapy." *Powder Technology* (2010) 203: 432-439.

Koesdjojo, M.T.; Tennico, Y.H.; Remcho, V.T. "Fabrication of a Microfluidic System for Capillary Electrophoresis Using a Two-Stage Embossing Technique and Solvent Welding on Poly(methyl methacrylate) with Water as a Sacrificial Layer." *Analytical Chemistry* (2008) 80:2311-2318.

Koesdjojo, M.T.; Tennico, Y.H.; Rundel, J.T.; Remcho, V.T. "Two-stage polymer embossing of co-planar microfluidic features for microfluidic devices." *Sensors and Actuators B: Chemical* (2008) 131:692-697.

Kundu, S.; Bhangale, A.S.; Wallace, W.E.; Flynn, K.M.; Guttman, C.M.; Gross, R.A.; Beers, K.L. "Continuous flow enzyme-catalyzed polymerization in a microreactor." *Journal of the American Chemical Society* (2011) 133(15): pp. 6006-6011.

Lai, S.; Cao, X.; Lee, L.J. "A Packaging Technique for Polymer Microfluidic Platforms." *Analytical Chemistry* (2004) 76:1175-1183.

Lee, G-B.; Chen, S-H.; Huang, G-R.; Sung, W-C.; Lin, Y-H. "Microfabricated plastic chips by hot embossing methods and their applications for DNA separation and detection." *Sensors and Actuators B: Chemical* (2001) 75:142-148.

Lei, K.F.; Ahsan, S.; Budraa, N.; Li, W.J.; Mai, J.D. "Microwave bonding of polymer-based substrates for potential encapsulated micro/nanofluidic device fabrication." *Sensors and Actuators A: Physical* (2004) 114:340-346.

Li, S.; Chen, S. "Polydimethylsioxane Fluidic Interconnects for Microfluidic Systems." *IEEE Transactions on Advanced Packaging* (2003) 26(3): 242-247.

Licata, M.; Haag, E. "How to bond polycarbonate parts by solvent welding." *Plastics Engineering* (1986) 42(6):53-55.

Lim, Y.C.; Johnson, J.; Fei, Z.; Wu, Y.; Farson, D.F.; Lannutti, J.J.; Choi, H.W.; Lee, L.J. "Micropatterning and characterization of electrospun poly(ε-caprolactone)/gelatin nanofiber tissue scaffolds by femtosecond laser ablation for tissue engineering applications." *Biotechnology and Bioengineering* (2011) 108(1): pp. 116-126.

(56) References Cited

OTHER PUBLICATIONS

Lin, C-H.; Chao, C-H.; Lan, C-W. "Low azeotropic solvent for bonding of PMMA microfluidic devices." *Sensors and Actuators B: Chemical* (2007) 121:698-705.

Liu, S-J.; Chiang, F-J.; Hsiao, C-Y.; Kau, Y-C.; Liu, K-S. "Fabrication of balloon-expandable self-lock drug-eluting polycaprolactone stents using micro-injection molding and spray coating techniques." *Annals of Biomedical Engineering* (2010) 38(10): pp. 3185-3194.

Machell, J.S.; Greener, J.; Contestable, B.A. "Optical properties of solvent-cast polymer films." *Macromolecules* (1990) 23: pp. 186-194.

Manz, A.; Fettinger, J.C.; Verpoorte, E.; Widmer, H.M.; Harrison, D.J. "Micromachining of monocrystalline silicon and glass for chemical-analysis systems—a look into next century technology or just a fashionable craze?" *Trends in Analytical Chemistry* (1991) 5:144-149.

McDonald, J.C.; Duffy, D.C.; Anderson, J.R.; Chiu, D.T.; Wu, H.; Schueller, O.J.A.; Whitesides, G.M. "Fabrication of microfluidic systems in poly(dimethylsiloxane)." *Electrophoresis* (2000) 21:27-40.

Muck, A.; Wang, J.; Jacobs, M.; Chen, G.; Chatrathi, M.P.; Jurka, V.; Výborný, Z.; Spillman, S.; Sridharan, G.; Schöning, M.J. "Fabrication of Poly(methyl methacrylate) Microfluidic Chips by Atmospheric Molding." *Analytical Chemistry* (2004) 76:2290-2297.

Peeni, B.A.; Lee, M.L.; Hawkins, A.R.; Woolley, A.T. "Sacrificial layer microfluidic device fabrication methods." *Electrophoresis* (2006) 27:4888-4895.

"Reusable, robust NanoPort connections to PDMS chips." Chips and Tips, Oct. 8, 2008. rsc.org, blog, downloaded Jun. 27, 2013.

Roberts, M.A.; Bercier, P.; Rossier, J.; Seddon, B.J.; Girault, H.H. "UV-laser machined polymer substrates for the development of micro-diagnostic systems." *Analytical Chemistry* (1997) 69:2035-2042, abstract only.

Rossier, J.S.; Roberts, M.A.; Ferrigno, R.; Girault, H.H. "Electrochemical Detection in Polymer Microchannels." *Analytical Chemistry* (1999) 71:4294-4299.

Rossier, J.S.; Ferrigno, R.F.; Girault, H.H. "Electrophoresis with electrochemical detection in a polymer microdevice." *Journal of Electroanalytical Chemistry* (2000) 492:15-22.

Rossier, J.S.; Bercier, P.; Schwarz, A.; Loridant, S.; Girault, H.H. "Topography, Crystallinity and Wettability of Photoablated PET surfaces." *Langmuir* (1999) 15:5173-5178.

Rundel, J.T.; Paul, B.K.; Remcho, V.T. "Organic solvent nanofiltration for microfluidic purification of poly(amidoamine) dendrimers." *Journal of Chromatography A* (2007) 1162:167-174.

Santiago, L.Y.; Nowack, R.W.; Rubin, J.P.; Marra, K.G. "Peptide-surface modification of poly(caprolactone) with laminin-derived sequences for adipose-derived stem cell applications." *Biomaterials* (2006) 27: pp. 2962-2969.

Sarasam, A.; Madihally, S.V. "Characterization of chitosan-polycaprolactone blends for tissue engineering applications." *Biomaterials* (2005) 26: pp. 5500-5508.

Shah, J.J.; Geist, J.; Locascio, L.E.; Gaitan, M.; Rao, M.V.; Vreeland, W.N. "Capillarity Induced Solvent-Actuated Bonding of Polymeric Microfluidic Devices." *Analytical Chemistry* (2006) 78:3348-3353.

Skotak, M. "Letter to the Editor." *Carbohydrate Polymers* (2011) 85: pp. 1-3.

Sousa, A.; Sengonul, M.; Latour, R.; Kohn, J.; Libera, M. "Selective protein adsorption on a phase-separated solvent-cast polymer blend." *Langmuir* (2006) 22: pp. 6286-6292.

Sun, X.; Peeni, B.A.; Yang, W.; Becerril, H.A.; Woolley, A.T. "Rapid Prototyping of Poly(methyl methacrylate) Microfluidic Systems Using Solvent Imprinting and Bonding." *Journal of Chromatography A* (2007) 1162(2):162-166.

Upchurch Scientific. *IDEX Health & Science*. n.d. Web Store, downloaded Jun. 27, 2013.

Wang, J.; Pumera, M.; Chatrathi, M.P.; Escarpa, A.; Konrad, R.; Griebel, A.; Dörner, W.; Löwe, H. "Towards disposable lab-on-a-chip: Poly(methylmethacrylate) microchip electrophoresis device with electrochemical detection." *Electrophoresis* (2002) 23:596-601.

Woodruff, M.A.; Hutmacher, D.W. "The return of a forgotten polymer—Polycaprolactone in the $21^{st}$ century." *Progress in Polymer Science* (2010) 35: pp. 1217-1256.

Xie, H.; Yang, Q.; Sun, X.; Yang, J.; Huang, Y. "Gas sensor arrays based on polymer-carbon black to detect organic vapors at low concentration." *Sensors and Actuators B: Chemical* (2006) 113: pp. 887-891.

Yang, C-H.; Huang, K-S.; Lin, Y-S.; Lu, K.; Tzeng, C-C.; Wang, E-C.; Lin, C-H.; Hsu, W-Y.; Chang, J-Y. "Microfluidic assisted synthesis of multi-functional polycaprolactone microcapsules: incorporation of CdTe quantum dots, $Fe_3O_4$ superparamagnetic nanoparticles and tamoxifen anticancer drugs." *Lab Chip* (2009) 9: pp. 961-965.

Ye, M-Y.; Yin, X-F.; Fang, Z-L. "DNA separation with low-viscosity sieving matrix on microfabricated polycarbonate microfluidic chips." *Analytical Bioanalytical Chemistry* (2005) 381:820-827.

Yeo, L.Y.; Friend, J.R. "Ultrafast microfluidics using surface acoustic waves." *Biomicrolfluidics* (2009) 3: 23 pp.

Ying, T.; Pi-xin, W.; Kun, X.; Hui-yong, A.; Li-song, D. "Starch/Polycaprolactone blends compatibilized with starch modified polyurethane." *Chemical Research in Chinese Universities* (2010) 26(3): pp. 483-487.

Yokoyama, K.; Ebisawa, F. "Detection and evaluation of fragrances by human reactions using a chemical sensor based on adsorbate detection." *Analytical Chemistry* (1993) 65: pp. 673-677.

Zhao, Y.; Chen, W.; Peng, C.; Liu, L.; Xue, F.; Zhu, S.; Kuang, H.; Xu, C. "Facile preparation of fluorescence-encoded microspheres based on microfluidic system." *Journal of Colloid and Interface Science* (2010) 325: pp. 337-342.

Zheng, W.; Li, J.; Zheng, Y.F. "An amperometric biosensor based on hemoglobin immobilized in poly(ε-caprolactone) film and its application." *Biosensors & Bioelectronics* (2008) 23: pp. 1562-1566.

Zhou, H.; Zhao, X.; Wang, J. "Poly(ε-caprolactone) as substrate for water denitrification." *International Journal of Environment and Pollution* (2009) 38(3): pp. 349-359.

Zhu, Y.; Gao, C.; Liu, X.; Shen, J. "Surface modification of polycaprolactone membrane via aminolysis and biomacromolecule immobilization for promoting cytocompatibility of human endothelial cells." *Biomacromolecules* (2002) 3: pp. 1312-1319.

\* cited by examiner

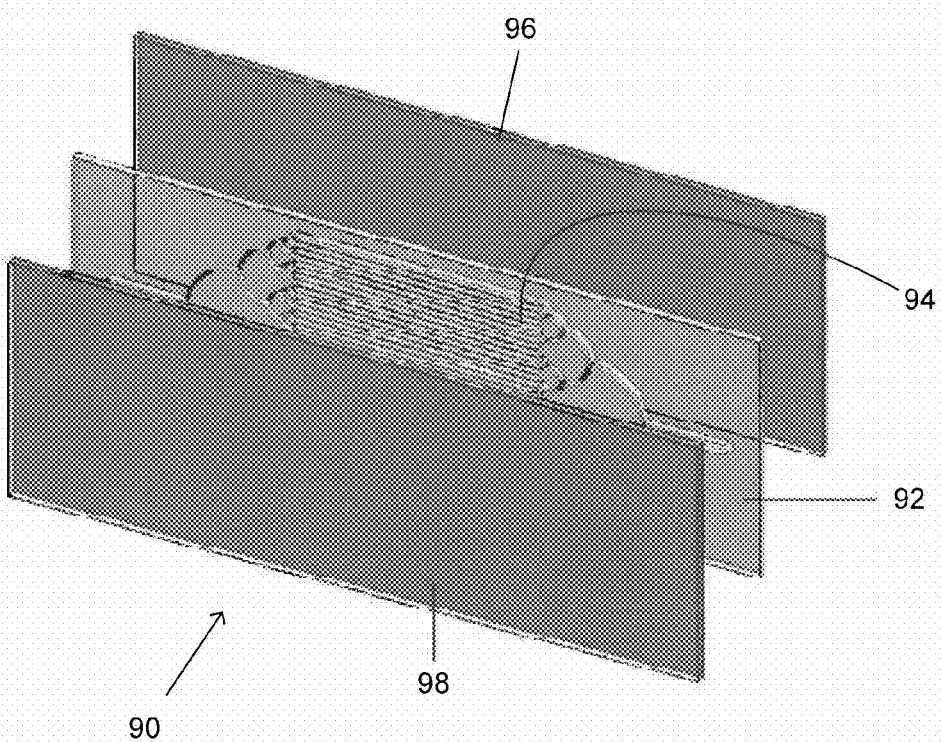
FIG. 9
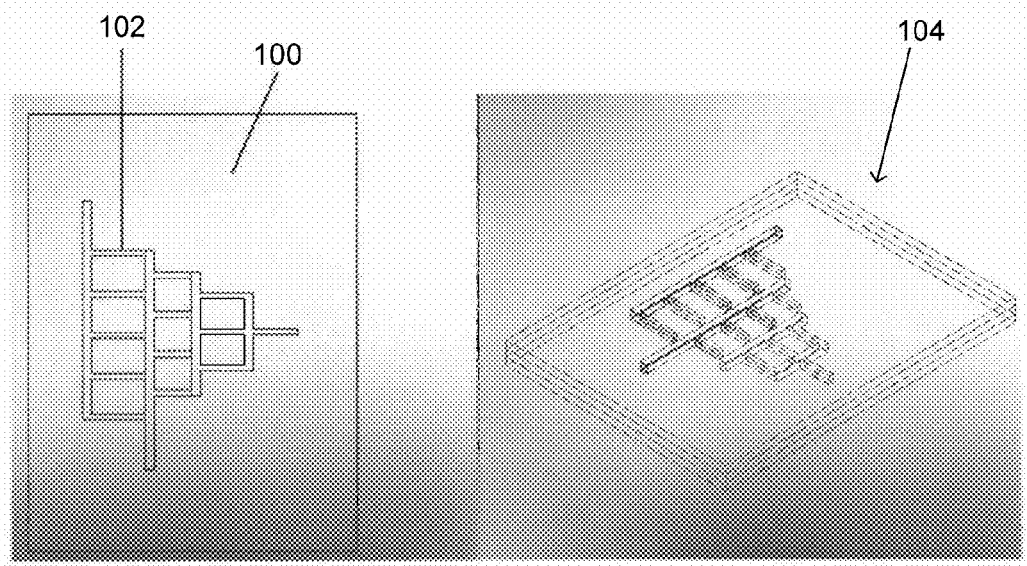
FIG. 10
FIG. 11

BONDING AGENT AND DEVICE FOR USE IN MICROFLUIDICS

CROSS REFERENCE TO RELATED APPLICATION

This application claims the benefit of U.S. Provisional Application No. 61/522,060, which was filed on Aug. 10, 2011, and is incorporated herein by reference in its entirety.

FIELD

Disclosed embodiments concern a bonding agent for use in microfluidics, a microfluidic device comprising the bonding agent, and method for using the microfluidic device.

BACKGROUND

Microfluidic devices have become increasingly popular due to their ability to analyze minute quantities of samples and their high-throughput sampling capabilities. Novel, versatile, and robust fabrication methods are needed both to make microfluidic devices more available to the research lab and the commercial market. In microfabrication, rapid prototyping capability is highly desirable since design modification can be done quickly and inexpensively.

There are many fabrication techniques available in creating microchips for use in microfluidic devices, such as photolithography with poly(dimethylsiloxane) PDMS, micromachining, thermal embossing, and injection molding, each technique having its own challenges in each step of fabrication. There are many parameters that need to be considered and optimized before a good fabrication technique can be realized. One of the most commonly used methods for fabrication, such as making microchannels, is hot embossing as it allows for a simple and quick means to make replicas of a master template. The next step after creating the microchannel is the bonding process to form a complete fluidic channel. Many bonding procedures have been used, such as solvent bonding, thermal bonding, and microwave bonding, each with its own advantages and drawbacks, but all having the same principle, which is to provide a quick and effective bonding method that allow for channel preservation.

A microfluidic system usually requires multiple interconnects, and currently there are no standard interconnections used in this field. A simple and reliable interconnect is highly desirable for microfluidic devices, especially for rapid prototyping. There are a number of current products available to accommodate these needs. The most common and simplest approach is the direct integration of tubing to the ports of the microchip using epoxy glue or adhesives. However, direct connection to the inlet reservoir using an epoxy often leads to occluded microchannels. Commercially available connections, such as NanoPort™ from IDEX use a threaded nut and ferrule system, and can be integrated onto the chip ports by means of adhesive rings and epoxy glue. The drawback to this method is that the non-removable epoxy glue takes time to cure and requires high temperatures for complete curing, making it incompatible with low glass transition (Tg) polymers. Other available products, such as edge connectors provide efficient interfacing and allow rapid connections and reusability. However, they are designed to be interfaced to a standard microchip format. This limits the compatibility of other chips with different geometries, layout or sizes. As a result, a need exists in this field for connecting components of microfluidic devices in an effective, efficient, and versatile manner.

Conventional surface modification processes concerning coupling biological compatible polymers with biomolecules can often be time consuming and labor intensive. For example, standard functionalization procedures of biomolecules typically involves the following steps: 1) activating the surface; 2) applying respective reactive groups and linkers to the surface of the substrate of interest; 3) incubating the sample (typically requiring 2 to 12 hours, depending on the type of molecules); 4) washing away the excess unreacted molecules; 5) applying biomolecules of interest; and 6) rinsing. There exists a need in this field for a more efficient, cost-effective approach.

SUMMARY

Particular disclosed embodiments concern a device, comprising a first component, a second component, and a bonding agent for bonding the first component to the second component. Certain disclosed embodiments of the bonding agent have a formula

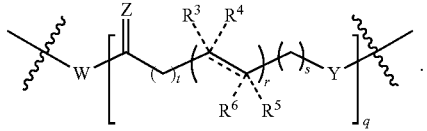

With reference to the general formula, Z, Y, and W independently are selected from O, S, NH, and $NR^2$, where $R^2$ is selected from hydrogen, aliphatic, aryl, and heteroaryl. $R^3$, $R^4$, $R^5$ and $R^6$ (if present) independently are selected from hydrogen, aliphatic, aryl, heteroaryl, and a heteroatom-containing moiety selected from halogen, aldehyde (—$R^a$CHO), acyl halide (—$R^a$C(O)X) (where X is selected from fluorine, chlorine, bromine, and iodine), carbonate (—$R^a$OC(O)$OR^b$), carboxyl (—$R^a$C(O)OH), carboxylate (—$R^a$COO$^-$), ether (—$R^a OR^b$), ester (—$R^a$C(O)$R^b$, or —$R^a$OC(O)$R^b$), hydroxyl (—$R^a$OH), ketone (—$R^a$C(O)$R^b$), silyl ether ($R^b R^c R^d$SiO$R^a$—), peroxy (—$R^a$OO$R^b$), hydroperoxy (—$R^a$OOH), phosphate (—$R^a$OP(O)(OH)$_2$), phosphoryl (—$R^a$P(O)(OH)$_2$), phosphine (—P$R^a R^b R^c$), thiol (—$R^a$SH), thioether/sulfide (—$R^a$SR), disulfide (—$R^a$SS$R^b$), sulfinyl (—$R^a$S(O)$R^b$), sulfonyl (—$R^a$SO$_2 R^b$), carbonothioyl (—$R^a$C(S)$R^b$ or —$R^a$C(S)H), sulfino (—$R^a$S(O)OH), sulfo (—$R^a$SO$_3$H), thiocyanate (—$R^a$SCN), isothiocyanate (—$R^a$NCS), oxazole, oxadiazole, imidazole, triazole, tetrazole, amide (—$R^a$C(O)NR$^b R^c$, or —$R^a$NR$^b$C(O)$R^c$), azide (N$_3$), azo (—$R^a$NN$R^b$), cyano (—$R^a$OCN), isocyanate (—$R^a$NCO), imide (—$R^a$C(O)NR$^b$C(O)$R^c$), nitrile (—$R^a$CN), isonitrile (—$R^a$N$^+$C$^-$), nitro (—$R^a$NO$_2$), nitroso (—$R^a$NO), nitromethyl (—$R^a$CH$_2$NO$_2$), and amine (—$R^a$NH$_2$, —$R^a$NHR$^b$, —$R^a$NR$^b R^c$). $R^a$ is absent, aliphatic, aryl, heteroaliphatic, or heteroaryl. $R^b$, $R^c$, and $R^d$ independently are hydrogen, aliphatic, aryl, heteroaliphatic, heteroaryl, and any combination thereof. The variable r is 1 to 4; s and t independently may range from 0 to about 4; and q ranges from at least 1 to about 1000. In particular disclosed embodiments, the bonding agent has a formula

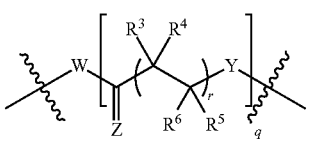

and/or a formula

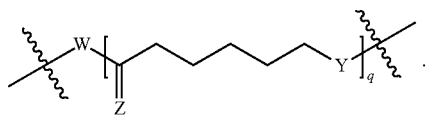

Particular disclosed embodiments concern a bonding agent having a formula

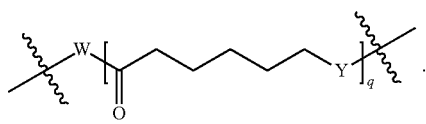

Certain embodiments concern using polycaprolactone, polycaprolactone diol, polycaprolactone triol, polycaprolactone-block-polytetrahydrofuan-block polycaprolactone, poly(ethylene oxide)-block-polycaprolactone, poly(ethylene glycol)-block-poly(e-caprolactone) methyl ether, and combinations thereof as the bonding agent.

In particular disclosed embodiments, the bonding agent is a thin film formed by spin coating, spraying, rolling, dipping, or heat pressing. The thin film may have a thickness ranging from 1 μm to about 1 mm, from about 1 μm to about 100 μm, from about 1 μm to about 10 μm, from about 1 μm to about 5 μm, from about 50 μm to about 300 μm, or from about 100 μm to about 200 μm. More typically, the bonding agent has a thickness ranging from about 1 μm to about 3 μm.

Certain embodiments concern using a first component and a second component independently selected from a lamina, a microchip, a port, a valve, a portable detector, and combinations thereof. In particular disclosed embodiments, the first component or the second component is a lamina or a microchip comprising a polymer, such as an organic polymer, with representative embodiments being selected from (poly)methylmethacrylate (PMMA), polycarbonate (PC), polyetherimide (PEI), and poly(ethylene terephthalate) (PETE), poly(dimethylsiloxane) (PDMS), polyurethane, polyethyleneterephthalate glycol (PETG), polyvinylchloride (PVC), polysulfone, and combinations thereof.

In particular disclosed embodiments, the first component and the second component are coupled together with the bonding agent. Also, the first component and/or the second component may be substantially coated with the bonding agent. In particular disclosed embodiments, the first component and/or the second component comprises at least one channel, such as a microchannel and/or nanochannel. A person of ordinary skill in the art will appreciate that microchannels can have varying dimensions, but exemplary dimensions range from a width of about 100 μm to at least about 500 μm and a depth ranging from about 35 μm to about 160 μm; more typically having a width ranging from about 200 μm to about 400 μm and a depth ranging from about 25 μm to about 140 μm. In disclosed embodiments nanochannels may have a depth ranging from about 1 nm to at least about 500 nm; more typically from about 50 nm to about 500 nm. In particular disclosed embodiments, nanochannels may have a width ranging from about 1 nm to about 500 nm; even more typically from about 1 nm to about 100 nm. Certain disclosed embodiments concern microchannels and/or nanochannels ranging in length from greater than 0 mm to about 10 mm; more typically from greater than 0 mm to about 5 mm.

In certain disclosed embodiments, the channel may be capped or sealed with the bonding agent. Particular disclosed embodiments concern using a bonding agent that has been chemically modified before using the device, such as by reacting the bonding agent with reagents capable of converting functional groups of the bonding agent into functional groups suitable for reaction with an additional component, such as a biomolecule or small compound.

Certain disclosed embodiments concern a device comprising at least one port, at least one lamina comprising at least one channel, and the disclosed bonding agent. The lamina and port are connected using the bonding agent. In particular disclosed embodiments, the bonding agent is polycaprolactone, but may also be selected from those species previously disclosed herein. Other disclosed embodiments concern a device comprising at least one port, a plurality of operatively associated lamina, and the disclosed bonding agent wherein the bonding agent couples the port and operatively associated lamina.

In particular disclosed embodiments, the device may comprise a hydrophilic substrate and at least one channel defined by the disclosed bonding agent. The hydrophilic substrate may be paper in some disclosed embodiments. In particular disclosed embodiments, the at least one channel may be defined to have a particular pattern by adding a solution of the bonding agent in a manner that defines the boundary of the particular pattern. In other embodiments, the hydrophilic substrate may be substantially coated with the bonding agent. In particular disclosed embodiments, the hydrophilic substrate may be exposed to a radiation source, which provides energy sufficient to penetrate the hydrophilic substrate and melt or substantially soften the bonding agent, which then becomes exposed, thus defining the at least one channel.

Particular disclosed embodiments concern a method for making a device comprising providing two or more components, providing the disclosed bonding agent, coupling the bonding agent with at least one of the two or more components, and subsequently coupling the remaining component(s) with the bonding agent-coated component. In certain embodiments, the two or more components independently may be selected from a lamina, a microchip, a port, a valve, a portable detector, and combinations thereof. More typically, the two or more components are selected from a port and a lamina or a microchip comprising a polymer, such as an organic polymer, which in exemplary embodiments may be selected from PMMA, PC, PEI, PETE, PDMS, polyurethane, PETG, PVC, polysulfone, and combinations thereof.

In certain disclosed embodiments, coupling comprises coating at least one of the two or more components with a thin film of the bonding agent, such as by spin coating, spraying, rolling, dipping, or heat pressing. In particular disclosed embodiments, the thin film is formed by exposing at least one of the two or more components to a solution of the bonding agent, comprising the bonding agent and at least one solvent suitable for dissolving the bonding agent. In certain embodiments, the solvent may be selected from halogenated solvents (e.g. chloroform, dichloromethane), heterocyclic solvents (e.g. 1,4-dioxane, tetrahydrofuran), ketone-containing solvents (e.g. methyl ethyl ketone), and combinations thereof.

The thin film may have a thickness ranging from 1 μm to about 1 mm, from about 1 μm to about 100 μm, from about 1 μm to about 10 μm, from about 1 μm to about 5 μm, from about 50 μm to about 300 μm, or from about 100 μm to about 200 μm; more typically from about 1 μm to about 3 μm. In other disclosed embodiments, the thin film may be a preformed thin film, which is subsequently added to at least one of the two or more components. The pre-formed thin film may be placed on at least one of the two or more components, heated, and allowed to cool at room temperature. In certain disclosed embodiments, the temperatures range from about 50° C. to about 70° C., from about 55° C. to about 70° C., or from about 60° C. to about 70° C.; more typically from about 55° C. to about 60° C.; even more typically from about 60° C. to about 63° C.

In particular disclosed embodiments, the method may further comprise coupling the two or more components together using the bonding agent as a thin film positioned between the two or more components. In this context, the thin film may be positioned by coupling the bonding agent to one component and then coupling the second component, or by coupling the bonding agent with a third component and subsequently coupling the third component between the first and second component. In particular disclosed embodiments, the bonding agent is heated and then allowed to cool. In certain disclosed embodiments, the method may further comprise using the bonding agent to seal the at least one channel. In particular disclosed embodiments, coupling may further comprise applying pressure to the two or more components and the bonding agent, such as pressure ranging from greater than 14 psi to about 200 psi; more typically from greater than 14 psi to about 100 psi.

Certain disclosed embodiments concern a method for making a device, comprising providing at least one hydrophilic substrate, providing the disclosed bonding agent, and coupling the at least one hydrophilic substrate to the bonding agent. In particular disclosed embodiments, the bonding agent may be neat, or it may be in solution. In particular disclosed embodiments, coupling may comprise using a liquid handler to dispense the bonding agent on the hydrophilic substrate, and the liquid handler may be associated with a printer in order to make patterned-defined channels on the hydrophilic substrate.

The foregoing and other objects, features, and advantages of the invention will become more apparent from the following detailed description, which proceeds with reference to the accompanying figures.

BRIEF DESCRIPTION OF THE DRAWINGS

FIG. 9 is an image illustrating a disclosed embodiment wherein a lamina comprising a plurality of microchannels is coupled with both a top and bottom polymeric sheet, both of which comprise the bonding agent.

FIG. 10 is a schematic diagram illustrating a single lamina comprising a plurality of microchannels.

FIG. 11 is a schematic diagram illustrating a disclosed embodiment wherein a plurality of the single lamina illustrated in FIG. 10 is operatively associated to form multilayered laminae.

DETAILED DESCRIPTION

I. Terms and Abbreviations

Figure 1:
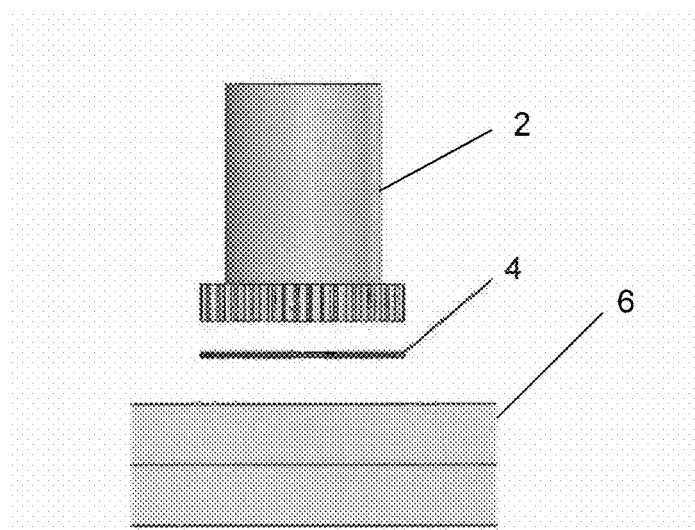
FIG. 1 is an image of a disclosed embodiment wherein two microfluidic device components are coupled together using the disclosed bonding agent.

Unless otherwise noted, technical terms are used according to conventional usage. As used herein, the singular terms "a," "an," and "the" include plural referents unless context clearly indicates otherwise. Similarly, the word "or" is intended to include "and" unless the context clearly indicates otherwise. Also, as used herein, the term "comprises" means "includes." Hence "comprising A or B" means including A, B, or A and B. It is further to be understood that all molecular weight or molecular mass values, given compounds are approximate, and are provided for description. Although methods and materials similar or equivalent to those described herein can be used in the practice or testing of the present disclosure, suitable methods and materials are described below. All publications, patent applications, patents, and other references mentioned herein are incorporated by reference in their entirety. In case of conflict, the present specification, including explanations of terms, will control. In addition, the materials, methods, and examples are illustrative only and not intended to be limiting.

In order to facilitate review of the various examples of this disclosure, the following explanations of specific terms are provided:

Bonding Agent: A reagent suitable for coupling two or more components of a microfluidic device together or for sealing one or more microchannels. In other disclosed embodiments, the bonding agent may itself be used to make-up a component of a microfluidic device and thereby be coupled with at least one other component.

Coupled: The term "coupled" means joined together, either directly or indirectly.

Heteroaryl: An aryl group, which contains one or more atoms other than carbon and hydrogen, such as, but not limited to, oxygen, sulfur, nitrogen, phosphorus, silicon, boron, and selenium.

Heteroatom: Any atom that is not carbon or hydrogen. Examples include, but are not limited to, nitrogen, oxygen, sulfur, phosphorus, boron, chlorine, bromine, fluorine, and iodine.

Heteroatom-containing moiety: A moiety present in a molecule that contains at least one atom which is not carbon or hydrogen. Examples include, but are not limited to, aldehyde (—$R^aCHO$), acyl halide (—$R^aC(O)X$) (where X is selected from fluorine, chlorine, bromine, and iodine), carbonate (—$R^aOC(O)OR^b$), carboxyl (—$R^aC(O)OH$), carboxylate (—$R^aCOO^-$), ether (—$R^aOR^b$), ester (—$R^aC(O)OR^b$, or —$R^aOC(O)R^b$), hydroxyl (—$R^aOH$), ketone (—$R^aC(O)R^b$), silyl ether ($R^bR^cR^dSiOR^a$—), peroxy (—$R^aOOR^b$), hydroperoxy (—$R^aOOH$), phosphate (—$R^aOP(O)(OH)_2$), phosphoryl (—$R^aP(O)(OH)_2$), phosphine (—$PR^aR^bR^c$), thiol (—$R^aSH$), thioether/sulfide (—$R^aSR$), disulfide (—$R^aSSR^b$), sulfinyl (—$R^aS(O)R^b$), sulfonyl (—$R^aSO_2R^b$), carbonothioyl (—$R^aC(S)R^b$ or —$R^aC(S)H$), sulfino (—$R^aS(O)OH$), sulfo (—$R^aSO_3H$), thiocyanate (—$R^aSCN$), isothiocyanate (—$R^aNCS$), oxazole, oxadiazole, imidazole, triazole, tetrazole, amide (—$R^aC(O)NR^bR^c$, or —$R^aNR^bC(O)R^c$), azide ($N_3$), azo (—$R^aNNR^b$), cyano (—$R^aOCN$), isocyanate (—$R^aNCO$), imide (—$R^aC(O)NR^bC(O)R^c$), nitrile (—$R^aCN$), isonitrile (—$R^aN^+C^-$), nitro (—$R^aNO_2$), nitroso (—$R^aNO$), nitromethyl (—$R^aCH_2NO_2$), and amine (—$R^aNH_2$, —$R^aNHR^b$, —$R^aNR^bR^c$). $R^a$ is absent, aliphatic, aryl, heteroaliphatic, or heteroaryl. $R^b$, $R^c$, and $R^d$ independently are hydrogen, aliphatic, aryl, heteroaliphatic, heteroaryl, and any combination thereof.

Lamina: A thin layer that may be formed from variety of materials, particularly metals, alloys, including intermetallic metals and alloys, polymeric materials, including solely by way of example and without limitation, polycaprolactone, and derivatives thereof, PDMS, polysulfones, polyimides, etc., ceramics, and combinations of such materials.

II. Bonding Agent for Making Microfluidic Devices

Particular disclosed embodiments concern a bonding agent used in making a microfluidic device. In some embodiments, the bonding agent provides an efficient and effective way to couple two or more components to make a microfluidic device. In some disclosed embodiments, the bonding agent is suitable for making a microfluidic device. The disclosed bonding agent is also suitable for use as a material in fabrication, and may also be modified in a manner that influences how the microfluidic device is used. The bonding agent may be selected from any chemical or material suitable for coupling two or more components of a microfluidic device using the method disclosed herein. In particular disclosed embodiments, the bonding agent may be a chemical monomer or polymer that is capable of being formed into a thin film and that is capable of coupling together two or more different microfluidic device components, such as polymeric sheets, microchips, ports, valves, and any other component typically used in a microfluidic device.

In certain disclosed embodiments, the bonding agent is capable of being softened or melted using heat. In particular disclosed embodiments, the bonding agent is heated at a temperature ranging from about 50° C. to about 70° C., or from about 55° C. to about 70° C., or from about 60° C. to about 70° C.; more typically from about 55° C. to about 60° C.; even more typically from about 60° C. to about 63° C. The bonding agent may be chosen to have a low thermal glass temperature ranging from about −50° C. to about −70° C.; from about −55° C. to about −65° C.; more typically from about −60° C. to about −62° C. In particular disclosed embodiments, the bonding agent may be resistant against dissolution or decomposition in certain solvents, such as organic solvents selected from halogenated solvents (e.g. chloroform, dichloromethane), heterocyclic solvents (e.g. 1,4-dioxane, tetrahydrofuran), ketone-containing solvents (e.g. methyl ethyl ketone), and combinations thereof. Also, the bonding agent may be selected to be biologically inert.

A. Bonding Agent

Disclosed embodiments of the bonding agent may be obtained by chemical modification of a bonding agent precursor having a Formula 1, illustrated below.

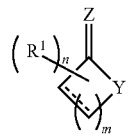

Formula 1

With reference to Formula 1, the bonding agent precursor may be a cyclic monomer capable of being converted into an acyclic polymer by methods known to those skilled in the art, such as by reaction with a nucleophile in a ring-opening reaction. In particular disclosed embodiments, Z and Y may individually be selected from O, S, NH, and $NR^2$, where $R^2$ may be selected from hydrogen, aliphatic, aryl, and heteroaryl. $R^1$ may be selected from hydrogen, aliphatic, aryl, heteroaryl, and a heteroatom-containing moiety selected from halogen (e.g. F, Cl, Br, and I), aldehyde (—$R^aCHO$), acyl halide (—$R^aC(O)X$) (where X is selected from fluorine, chlorine, bromine, and iodine), carbonate (—$R^aOC(O)OR^b$), carboxyl (—$R^aC(O)OH$), carboxylate (—$R^aCOO^-$), ether (—$R^aOR^b$), ester (—$R^aC(O)OR^b$, or —$R^aOC(O)R^b$), hydroxyl (—$R^aOH$), ketone (—$R^aC(O)R^b$), silyl ether ($R^bR^cR^dSiOR^a$—), peroxy (—$R^aOOR^b$), hydroperoxy (—$R^aOOH$), phosphate (—$R^aOP(O)(OH)_2$), phosphoryl (—$R^aP(O)(OH)_2$), phosphine (—$PR^aR^bR^c$), thiol (—$R^aSH$), thioether/sulfide (—$R^aSR$), disulfide (—$R^aSSR^b$), sulfinyl (—$R^aS(O)R^b$), sulfonyl (—$R^aSO_2R^b$), carbonothioyl (—$R^aC(S)R^b$ or —$R^aC(S)H$), sulfino (—$R^aS(O)OH$), sulfo (—$R^aSO_3H$), thiocyanate (—$R^aSCN$), isothiocyanate (—$R^aNCS$), oxazole, oxadiazole, imidazole, triazole, tetrazole, amide (—$R^aC(O)NR^bR^c$, or —$R^aNR^bC(O)R^c$), azide ($N_3$), azo (—$R^aNNR^b$), cyano (—$R^aOCN$), isocyanate (—$R^aNCO$), imide (—$R^aC(O)NR^bC(O)R^c$), nitrile (—$R^aCN$), isonitrile (—$R^aN^+C^-$), nitro (—$R^aNO_2$), nitroso (—$R^aNO$), nitromethyl (—$R^aCH_2NO_2$), and amine (—$R^aNH_2$, —$R^aNHR^b$, —$R^aNR^bR^c$). $R^a$ is absent, aliphatic, aryl, heteroaliphatic, or heteroaryl. $R^b$, $R^c$, and $R^d$ independently are hydrogen, aliphatic, aryl, heteroaliphatic, heteroaryl, and any combination thereof. Formula 1 may comprise one or more conjugated or unconjugated olefins, m may range from 0 to about 6, and n may range from 2 to about 14, or 2 to about 12, or 2 to about 10, or 2 to about 8, or about 2 to about 6. In particular disclosed embodiments, Z and Y are O, $R^1$ is hydrogen, m ranges from 2 to about 4, and n ranges from 6 to about 10 and the ring is saturated.

Particular disclosed embodiments concern a bonding agent that is made from chemical modification of a bonding agent precursor having any one of the following Formulas 2-4.

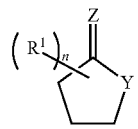

Formula 2

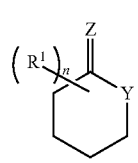

Formula 3

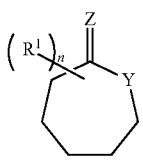

Formula 4

With reference to Formulas 2-4, Z, Y, $R^1$, and n are as previously recited.

In particular disclosed embodiments, the bonding agent may be obtained from chemical manipulation of E-caprolactone, illustrated below.

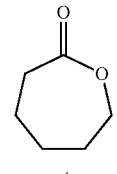

ε-caprolactone

In disclosed embodiments, the bonding agent is a polymer and is selected to have the general Formula 5, illustrated below.

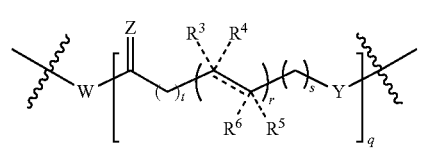

Formula 5

With reference to Formula 5, Z, Y, and W may independently be selected from O, S, NH, and $NR^2$, where $R^2$ may be selected from hydrogen, aliphatic, aryl, and heteroaryl. $R^3$, $R^4$, $R^5$, and $R^6$ (if present) independently may be selected from hydrogen, aliphatic, aryl, heteroaryl, and a heteroatom-containing moiety selected from halogen (e.g. F, Cl, Br, and I), aldehyde (—$R^aCHO$), acyl halide (—$R^aC(O)X$) (where X is selected from fluorine, chlorine, bromine, and iodine), carbonate (—$R^aOC(O)OR^b$), carboxyl (—$R^aC(O)OH$), carboxylate (—$R^aCOO^-$), ether (—$R^aOR^b$), ester (—$R^aC(O)OR^b$, or —$R^aOC(O)R^b$), hydroxyl (—$R^aOH$), ketone (—$R^aC(O)R^b$), silyl ether ($R^bR^cR^dSiOR^a$—), peroxy (—$R^aOOR^b$), hydroperoxy (—$R^aOOH$), phosphate (—$R^aOP(O)(OH)_2$), phosphoryl (—$R^aP(O)(OH)_2$), phosphine (—$PR^aR^bR^c$), thiol (—$R^aSH$), thioether/sulfide (—$R^aSR$), disulfide (—$R^aSSR^b$), sulfinyl (—$R^aS(O)R^b$), sulfonyl (—$R^aSO_2R^b$), carbonothioyl (—$R^aC(S)R^b$ or —$R^aC(S)H$), sulfino (—$R^aS(O)OH$), sulfo (—$R^aSO_3H$), thiocyanate (—$R^aSCN$), isothiocyanate (—R$^a$NCS), oxazole, oxadiazole, imidazole, triazole, tetrazole, amide (—R$^a$C(O)NR$^b$R$^c$, or —R$^a$NR$^b$C(O)R$^c$), azide (N$_3$), azo (—R$^a$NNR$^b$), cyano (—R$^a$OCN), isocyanate (—R$^a$NCO), imide (—R$^a$C(O)NR$^b$C(O)R$^c$), nitrile (—R$^a$CN), isonitrile (—R$^a$N$^+$C$^-$), nitro (—R$^a$NO$_2$), nitroso (—R$^a$NO), nitromethyl (—R$^a$CH$_2$NO$_2$), and amine (—RaNH$_2$, —R$^a$NHR$^b$, —R$^a$NR$^b$R$^c$). R$^a$ is absent, aliphatic, aryl, heteroaliphatic, or heteroaryl. R$^b$, R$^c$, and R$^d$ independently are hydrogen, aliphatic, aryl, heteroaliphatic, heteroaryl, and any combination thereof. In particular disclosed embodiments, Formula 5 may comprise one or more conjugated or unconjugated olefins. In embodiments where Formula 5 comprises one or more conjugated or unconjugated olefins, only one of R$^3$ and R$^4$ and only one of R$^5$ and R$^6$ is present in Formula 5. In embodiments where Formula 5 does not comprise one or more conjugated or unconjugated olefins, all of R$^3$, R$^4$, R$^5$, and R$^6$ may be present in Formula 5. In particular disclosed embodiments, r may range from 1 to 4, more typically from 1 to 3; even more typically from 1 or 2; s and t independently may range from 0 to about 4 or 0 to 3, or 0 to 2, or 0 to 1; more typically s and t range from 1 to 4, or 1 to 3, or 1 to 2. In particular disclosed embodiments, q ranges from at least 1 to about 1000, or at least 1 to about 900, or at least 1 to about 800, or at least 1 to about 700, or at least 1 to about 600, or at least 1 to about 500, or at least 1 to about 300, or at least 1 to about 250, or at least 1 to about 200, or at least 1 to about 150, or at least 1 to about 100.

In particular disclosed embodiments, the bonding agent may have a general Formula 6, illustrated below.

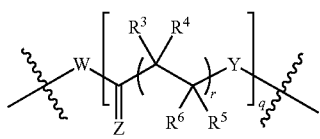

Formula 6

With reference to Formula 6, Z, Y, W, R$^3$, R$^4$, R$^5$, R$^6$, r, and q are as previously recited.

Other particular disclosed embodiments concern a polymeric bonding agent having a Formula 7, wherein Z, Y, W, and q are as previously recited.

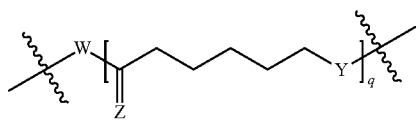

Formula 7

Certain embodiments of the disclosed bonding agent may have a Formula 8, illustrated below wherein wherein Y, W, and q are as previously recited.

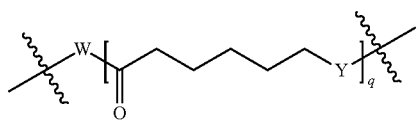

Formula 8

In particular embodiments, the bonding agent may be selected from the following exemplary compounds: polycaprolactone, polycaprolactone diol, polycaprolactone triol, polycaprolactone-block-polytetrahydrofuan-block polycaprolactone, poly(ethylene oxide)-block-polycaprolactone, poly(ethylene glycol)-block-poly(e-caprolactone) methyl ether, and combinations thereof.

Particular disclosed working embodiments concern using polycaprolactone as a bonding agent, the structure for which is shown below. In particular disclosed embodiments, the polycaprolactone has a molecular weight ranging from about 500 g/mol to at least about 100,000 g/mol; more typically from about 10,000 g/mol to about 14,000 g/mol; more typically from about 70,000 g/mol to about 90,000 g/mol. A person of ordinary skill in the art will recognize that any polycaprolactone compounds or derivatives thereof having any molecular weight falling within the disclosed ranges are contemplated by the present disclosure.

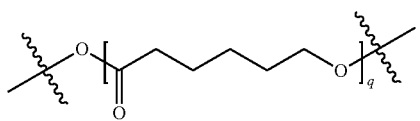

Polycaprolactone

B. Modified Bonding Agent

In particular disclosed embodiments, the bonding agent may be chemically modified in order to make a microfluidic device capable for use in various different applications, such as purification and characterization. In some disclosed embodiments, the bonding agent may be chemically modified before it is used to make the microfluidic device. For example, particular disclosed embodiments concern using a bonding agent having functional groups capable of coupling other substances that pass through the microfluidic device, such as, but not limited to, biomolecules, synthetic substances, and small molecules. Certain disclosed embodiments concern using exemplary compounds, such as poly(ethylene glycol)-block-poly(ϵ-caprolactone)methyl ether and polycaprolactone diol. These particular disclosed embodiments can be used to fabricate microchannels having a variety of wall surface chemistries. In other disclosed embodiments, the chemically-modified bonding agent may be obtained by chemically modifying the material from which it is derived. In particular disclosed embodiments, a monomer according to any one of Formulas 1-4 may be chemically modified to produce a functionalized monomer, which may then be polymerized to the corresponding functionalized polymer.

In other disclosed embodiments, the bonding agent may be chemically modified in situ; for example, the bonding agent may be used in one or more fabrication steps, to couple two or more microfluidic device components, or to coat one or more sidewalls of a microfluidic device, and then chemically modified using chemical methods known to a person of ordinary skill in the art. In particular disclosed embodiments, the bonding agent may have a Formula 9.

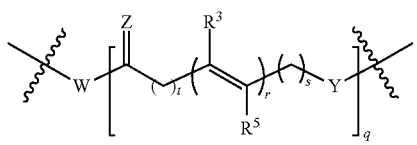

Formula 9

With reference to Formula 9, one or more olefins are present in the chemical structure of the bonding agent, and W, Y, Z, $R^3$, $R^5$, r, s, t, and q are as previously stated. A person of ordinary skill in the art will recognize that a compound comprising one or more olefins may be chemically modified, such as by oxidizing the one or more olefins. Such modifications will be recognized by a person of ordinary skill in the art to include oxidation, such as by dihydroxylation, epoxidation, and/or hydroboration followed by oxidation. Also, the bonding agent may be functionalized with one or more halogens and functional groups selected from, but not limited to, an amine group, a nitroso group, an azide group, an alkyl group, and an acyl group. These disclosed modification techniques may also be used to modify the bonding agent before its use in a microfluidic device.

In particular disclosed embodiments, the modified bonding agent may comprise one or more functional groups capable of coupling one or more compounds that pass through a microchannel in a microfluidic device. Particular disclosed embodiments concern using a bonding agent comprising one or more amine groups that are capable of binding with biomolecules, such as a protein, a nucleic acid, a polysaccharide, a lipid, and monomers thereof. Certain embodiments may have any one of general Formulas 10 or 11, illustrated below, wherein q is as previously recited.

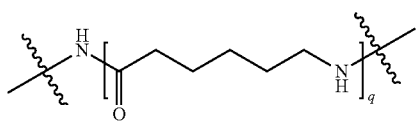

Formula 10

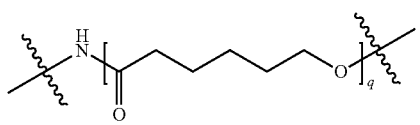

Formula 11

III. Embodiments of a Microfluidic Device Comprising the Disclosed Bonding Agent Particular disclosed embodiments concern a microfluidic device made substantially out of the bonding agent. In certain embodiments, the bonding agent may be used to make or fabricate a lamina comprising at least one microchannel and may also be used as the reagent used to couple two or more components together. In particular disclosed embodiments, a lamina coated with, or substantially made from, the bonding agent may be coupled with one or more ports using the same or different bonding agent as an adhesive to couple the ports. A person of ordinary skill in the art will recognize that components other than ports may be used, such as valves, portable detectors, and other laminae made from the bonding agent. Particular disclosed embodiments concern a microfluidic device comprising one or more layers of a bonding agent-based microchannel system that may be stacked both horizontally, vertically, or both without a significant loss in alignment or flow.

IV. Method for Making a Microfluidic Device

Disclosed herein are several embodiments of a method for using the disclosed bonding agent to make a microfluidic device. These embodiments are not intended to be limiting, and any method for using the disclosed bonding agent currently known or developed in the future is contemplated.

A. Fabrication

In particular disclosed embodiments, the bonding agent may be used in fabrication techniques to make components, for example components used in microfluidic devices. In certain disclosed embodiments, the bonding agent is a polymeric bonding agent having any one of Formulas 5-7. In particular disclosed embodiments, the polymeric bonding agent is polycaprolactone, selected to have a molecular weight within the molecular weight ranges previously recited.

In certain disclosed embodiments, fabrication encompasses forming a thin film of the bonding agent separately from, or on, one or more microfluidic device components. Any method known to a person of ordinary skill in the art for making thin films is contemplated in the disclosed method. Particular disclosed embodiments concern using spin coating, rolling, dipping, spraying, and heat pressing, In particular disclosed embodiments, the bonding agent may be heated and formed into a thin film having a thickness ranging from about 1 μm to about 1 mm, from about 1 μm to about 100 μm, from about 1 μm to about 10 μm, from about 1 μm to about 5 μm, or from about 50 μm to about 300 μm, or from about 100 μm to about 200 μm, or from about 1 μm to about 5 μm. In particular disclosed embodiments the layer of bonding agent ranges from about 1 μm to about 3 μm. The thickness of the bonding agent thin film obtained may depend upon temperature. For example, if a longer heating time period or higher temperature is used, the bonding agent may form a thinner film, whereas a shorter heating time period or lower temperature may result in a thicker film.

In other disclosed embodiments, the bonding agent thin film may be formed by applying the bonding agent to the microfluidic device component as a solution wherein it is combined with a solvent suitable for dissolving the bonding agent, such as those previously disclosed herein. The thickness of the bonding agent thin film formed using a solution of the bonding agent may be controlled by the concentration of the bonding agent in the solution. A higher concentration of bonding agent may make a thicker film, whereas a more dilute solution of the bonding agent may make a thinner film. In particular disclosed embodiment, pressure may be applied to the bonding agent to produce the thin film, but is not required. In some disclosed embodiments, a pressure less than about 100 psi may be used to form the thin film.

Figure 2:
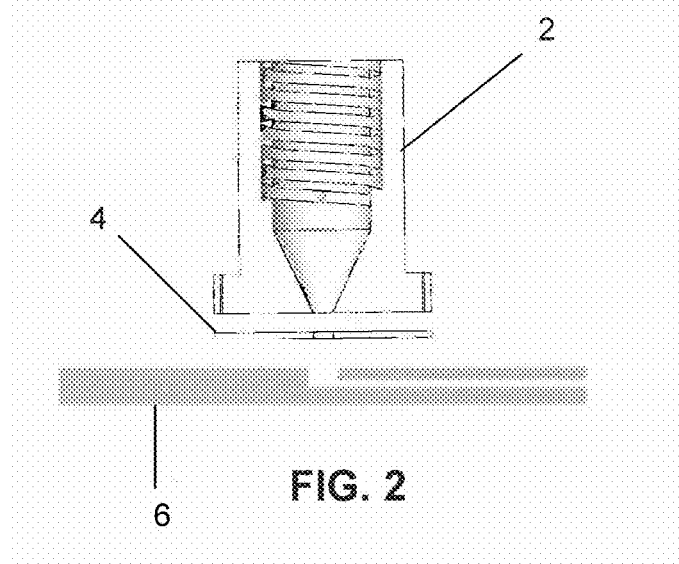
FIG. 2 is a cross-sectional view of the embodiment disclosed in FIG. 1.

1. Embodiments of Using a Bonding Agent to Couple Microfluidic Device Components In disclosed embodiments, the thin film of the bonding agent is used to couple two or more components of a microfluidic device. In particular disclosed embodiments, the two or more components of a microfluidic device may be selected from ports, microchips, valves, pumps, portable detectors, and any other components developed in the future for use in microfluidic devices. In particular disclosed embodiments, the thin film of the bonding agent is placed between the two components and heat is applied. Particular disclosed embodiments concern heating the assembly at a temperature sufficient to melt, or substantially soften the bonding agent. In particular disclosed embodiments, the temperature may range from about 50° C. to about 70° C., from about 55° C. to about 70° C., or from about 60° C. to about 70° C.; more typically from about 55° C. to about 60° C.; even more typically from about 60° C. to about 63° C. In particular embodiments, pressure may be applied to the assembly, a pressure which ranges from about 14 psi to about 200 psi; more typically from about 14 psi to about 100 psi; even more typically less than about 100 psi. In particular disclosed embodiments, the bonding agent is allowed to cool at room temperature until it becomes hard; typically the bonding agent will harden at room temperature in less than 5 minutes, more typically less than about 3 minutes, even more typically, less than about 1 minute. A disclosed working embodiment is illustrated in FIGS. 1 and 2. In FIG. 1, a microfluidic port 2 is coupled to a microfluidic lamina 6 via a thin layer of the bonding agent 4. FIG. 2 is a cross-sectional image of the components illustrated in FIG. 1.

In particular disclosed embodiments, a thin film of the bonding agent may be produced independently of the one or more microfluidic device components. For example, the bonding agent may be used to coat two sides of a sheet of material capable of conducting heat, but a person of ordinary skill in the art will recognize that the material need not be a thermal conductor. In particular embodiments, the material may be a metal selected from, but not limited to, copper, lead, aluminum, gold, and silver; an alloy comprising one or more of the disclosed metals, or a combination of one or more of the disclosed metals and a non-metal. In particular working embodiments, a double-sided metal tape, such as copper tape, is used.

Figure 3:
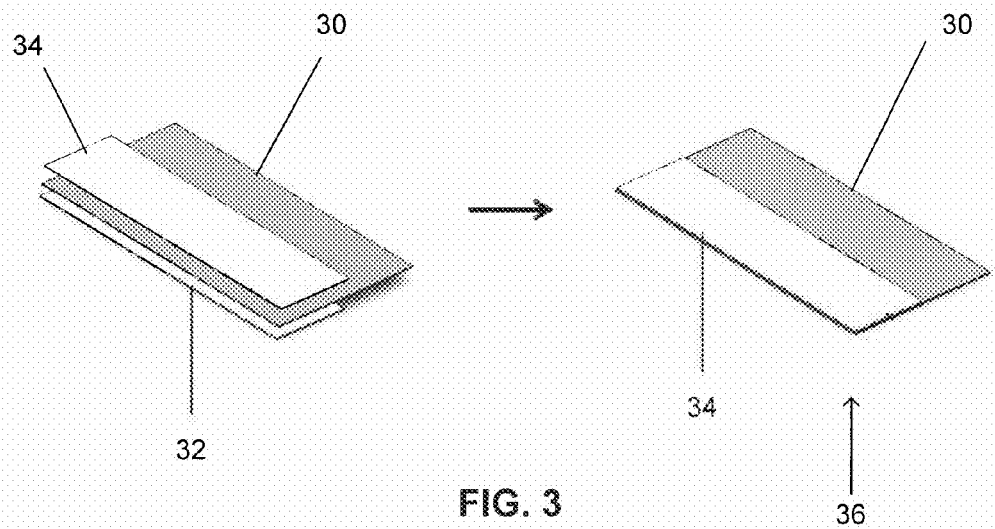
FIG. 3 is an image of a disclosed embodiment wherein a metal sheet is placed between two thin layers of the bonding agent and subsequently coupled with the two thin layers of the bonding agent.
Figure 4:
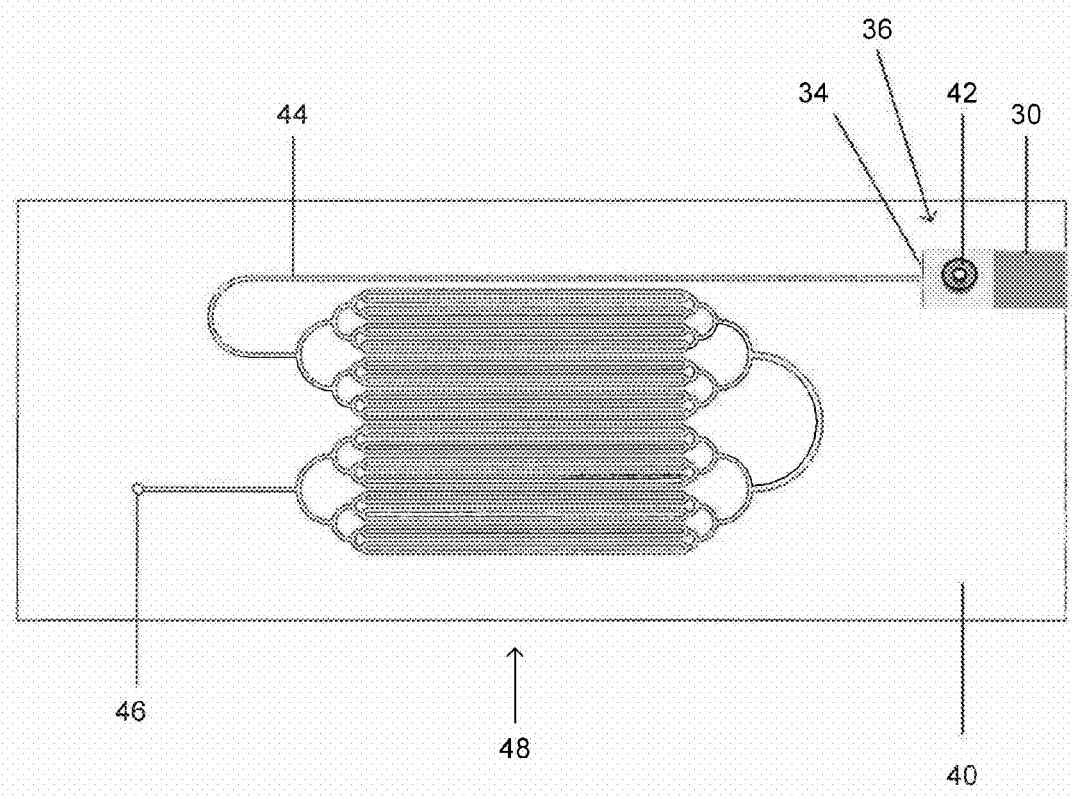
FIG. 4 is an image of a disclosed embodiment wherein a lamina comprising a plurality of microchannels is coupled with a port via a bonding agent-coated metal sheet.

An exemplary embodiment is illustrated in FIG. 3. According to FIG. 3, a piece of double-sided metal tape 30 is placed between two thin films of the bonding agent (32 and 34), which are pre-formed using a heated press. Heat is then applied to an exposed portion of the metal tape 30, which distributes heat to the two bonding agent thin films 32 and 34. In particular disclosed embodiments, the bonding agent becomes activated by the heat, wherein "activated" in this context means that the bonding agent is capable of adhering to one or more components. A completed assembly is obtained by placing the bonding agent-metal tape assembly 36 between one or more microfluidic device components. According to FIG. 4, the bonding agent-metal tape assembly 36 is placed on a first component, such as a lamina 40, wherein the activated bonding agent thin films 34 and 32 (not pictured) are located between the microchip 40 and a second component, such as connection port 42, for bonding. According to FIG. 4, the lamina may comprise a plurality of microchannels 44 and an inlet or outlet 46. The coupled apparatus 48 is then allowed to cool, whereby the bonding agent will harden and the components will remain coupled.

2. Embodiments of Using a Bonding Agent to Form Microchannel-Containing Microfluidic Device Components Particular disclosed embodiments concern using embodiments of the disclosed bonding agent to make microfluidic device components comprising one or more microchannels. For example, at least one side of a polymer in any form capable of being coated, such as a sheet or film, a coil, or a chip, may be coated with a thin film of the bonding agent. The thin film may be applied, followed by heating to melt or substantially soften the bonding agent, thus allowing it to adhere to a microfluidic device component. In particular disclosed embodiments, a thin film of the bonding agent may be formed after the microfluidic device component has been exposed to a suitable amount of the bonding agent, which in this context need not be a thin film, and heat has been applied. Once the bonding agent has been adhered to the microfluidic device component, a channel, such as a microchannel or nanochannel, may be made by any means known to those of ordinary skill in the art. Particular embodiments concern cutting the bonding agent-coated microfluidic device component using a tool, such as a mechanical knife plotter, a laser, or a manual cutting device.

Figure 5:
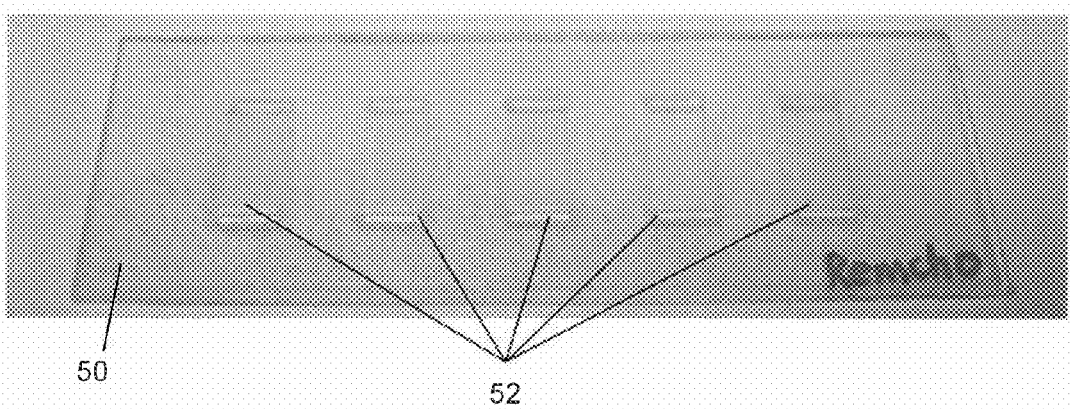
FIG. 5 is an optical image of a disclosed embodiment illustrating channels that have been cut into a sheet comprising the bonding agent.

In particular disclosed embodiments, the microfluidic device component is a lamina or a microchip, which may be in the form of a sheet of polymeric material, such as an organic polymer selected from, but not limited to, PMMA, PC, PEI, PETE, PDMS, polyurethane, PETG, (PVC, polysulfone, and combinations thereof. An exemplary embodiment of the disclosed method is illustrated in FIG. 5, which is an optical image of a lamina 50, comprising a plurality of channels 52 formed using an exemplary bonding agent, polycaprolactone.

In particular disclosed embodiments, the bonding agent may be used for sealing a microchannel. Disclosed embodiments concern combining a direct laser writing technique with a rapid bonding process utilizing embodiments of the disclosed bonding agent to make complete microfluidic laminae. The disclosed method concerns making microchannels or nanochannels using a laser cutting technique, such as laser ablation micromachining, followed by capping with the bonding agent. Other techniques for making the microchannels are contemplated, such as hot embossing, or any other techniques disclosed herein.

Figure 6:
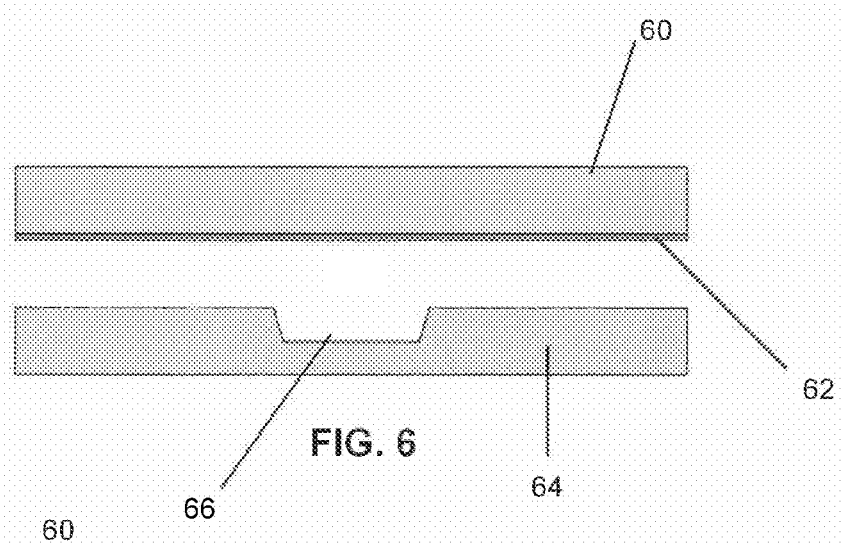
FIG. 6 is a cross sectional image of a disclosed embodiment before the bonding agent has been used to couple two components.
Figure 7:
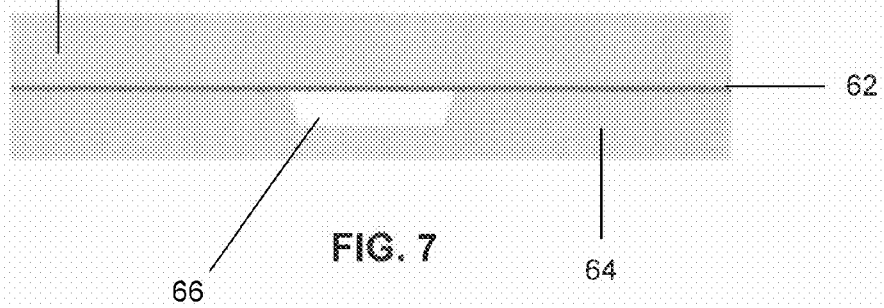
FIG. 7 is a cross sectional image of a disclosed embodiments wherein two components have been coupled using the bonding agent.
Figure 8:
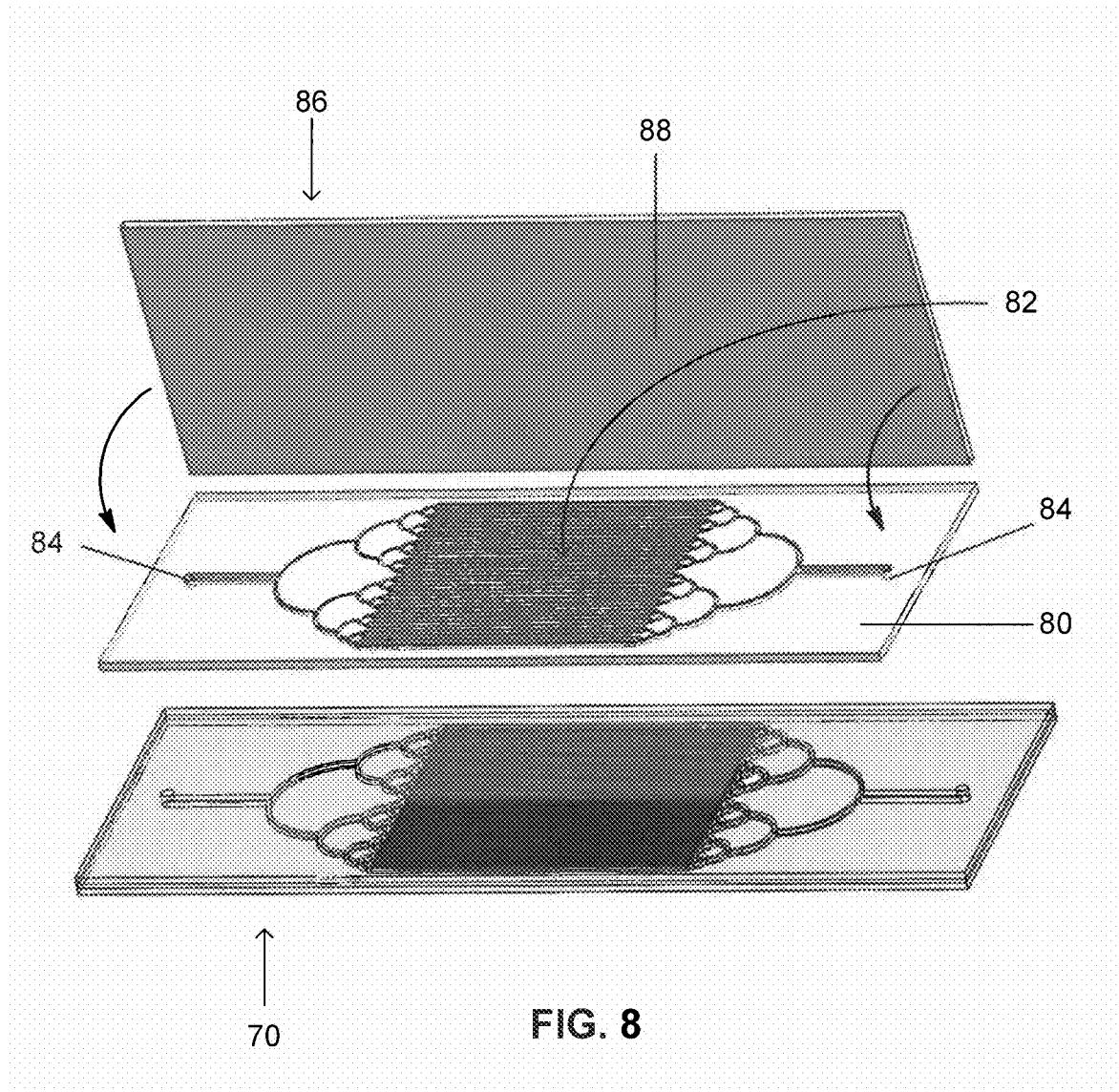
FIG. 8 is an image of a disclosed embodiment wherein a lamina comprising a plurality of microchannels is coupled with a polymeric sheet comprising the bonding agent.
Figure 12:
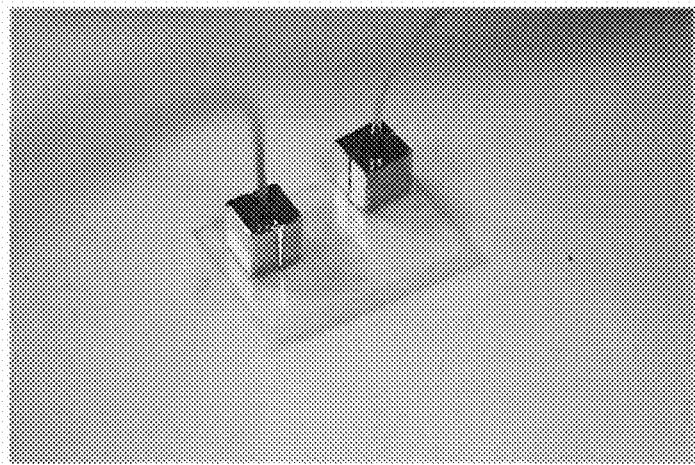
FIG. 12 is an optical image of a disclosed embodiment before a second liquid is added to the microchannels of the device comprising a first liquid.

In particular disclosed embodiments, a complete microfluidic channel may be made by forming the channel and then enclosing the channel with the disclosed bonding agent-coated polymer. Thus, a person of ordinary skill in the art will recognize that embodiments of the disclosed method lend themselves to making devices having various applications as well as allowing the ability to make hybrid polymer components, such as hybrid polymer laminae. FIGS. 6 and 7 are cross-sectional images of a disclosed embodiment wherein a top first component, such as lamina 60, which is coupled to a thin layer of the bonding agent 62, is placed on top of a second component, such as lamina 64 comprising a microchannel 66. FIG. 6 illustrates the separate components before they are combined, and FIG. 7 illustrates the final assembly when the components are combined. The bonding agent 62 caps (or seals) the microchannel 66 after heating and cooling. FIG. 8 illustrates a particular disclosed embodiment of a first component, such as lamina 80 comprising a plurality of microchannels 82 obtained using hot embossing of a polymer, and inlet and/or outlet holes 84. The microchannels may be capped using the bonding agent, which is coated over a second component, such as polymer sheet 86. The bonding agent-coated surface 88 is positioned facing the plurality of microchannels and the entire assembly 70 is obtained after being heated and pressed at approximately 60° C. Another disclosed embodiment is illustrated in FIG. 9 wherein a first component, such as lamina 92 comprising microchannels 94 is placed between a second and third component, both of which may be one-sided bonding agent-coated polymer sheets 96 and 98. The side comprising the bonding agent is positioned to face the microchip 92 and then a final assembly may be obtained by pressing and heating the pre-assembled arrangement 90 to approximately 60° C.

Figure 13:
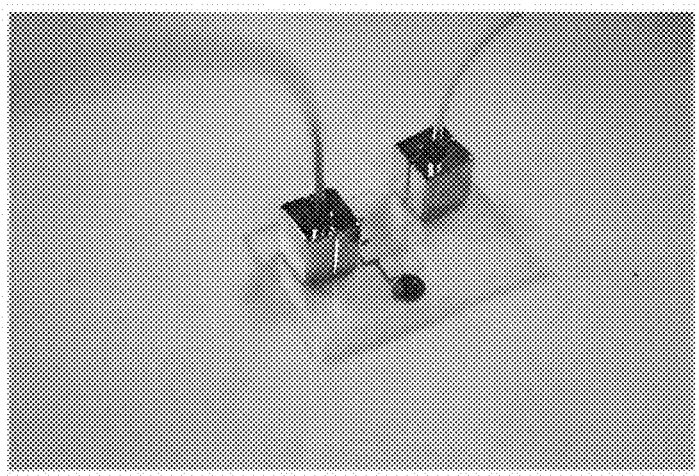
FIG. 13 is an optical image of the disclosed embodiment illustrated in FIG. 12 as liquid is passed through the microchannels illustrating that flow was not disrupted.
Figure 14:
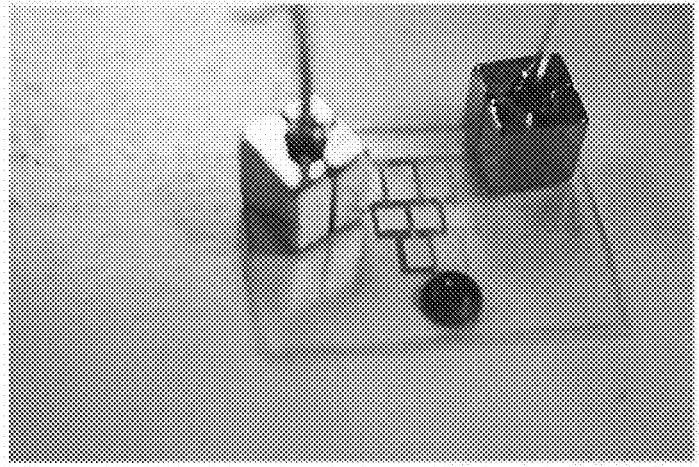
FIG. 14 is an optical image of the disclosed embodiment illustrated in FIG. 12 wherein the liquid is completely passed through the microchannels and no leaks are detected.
Figure 15:
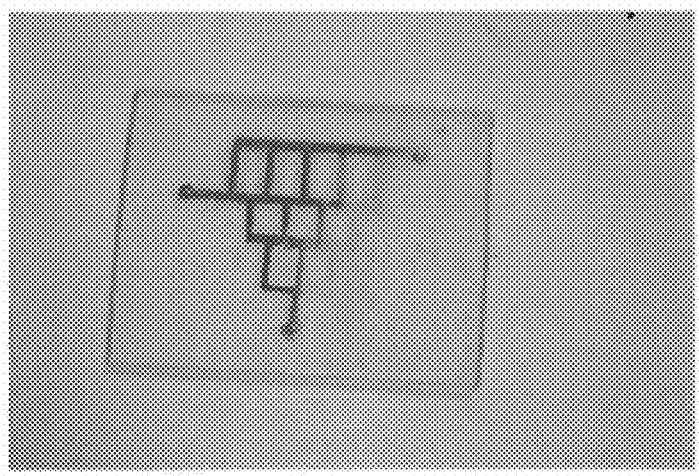
FIG. 15 is an optical image of the disclosed embodiment illustrated in FIGS. 12-14 wherein the device has been cleaned and no leaks are detected.

In particular disclosed embodiments, a plurality of layers of microchannels may be made using the bonding agent and one or more laminae and/or microchips comprising microchannels. For example, one or more laminae and/or microchips, made from the disclosed organic polymers may be operatively associated, such as by being stacked and/or coupled on top of, or beside one another in a manner sufficient to insure proper alignment and consistent flow. The number of laminae or layers of microchips that may be operatively associated can range from at least 2 to about 50; typically from at least 2 to about 10; even more typically from at least 2 to about 3; however, a person of ordinary skill in the art will recognize that any number of operatively associated laminae/microchips within the disclosed ranges are contemplated by the present disclosure. FIGS. 10 and 11 together illustrate a particular exemplary embodiment. According to FIG. 10, a single lamina 100 made from a polymeric sheet comprising microchannels 102 is stacked vertically together with similary laminae and bonded with both a top layer of a bonding agent-coated sheet and bottom layer of a bonding agent-coated sheet to form a multilayered laminae apparatus 104 (FIG. 11). FIGS. 12-15 illustrate that the multilayered microchip may be used substantially free of leaks. According to FIG. 12, a first colored fluid is injected into the microchannels and the fluid is allowed to flow through the microchannels. FIGS. 13 and 14 further illustrate the progression of the different colored fluids throughout the microchannels. FIG. 15 is an optical image of the final microchip after all microchannels are filled with fluid and the fluid delivery mechanism has been removed. As illustrated in FIG. 15, no leaks are detected as the all the fluid remains in the microchannels.

In further disclosed embodiments, channels may be directly patterned on the bonding agent layer. In particular disclosed embodiments, the bonding agent may first be spin-coated onto a surface, such as a silicon wafer or a polymeric sheet, to form a thin film of the bonding agent. Subsequently, direct patterning is carried out on the bonding agent layer using any method known to those skilled in the art to be capable of forming channels (e.g. microchannels and/or nanochannels), such as by using e-beam lithography wherein a beam of electrons is scanned in a patterned fashion across the surface of the bonding agent film. Other methods, such as hot embossing and laser cutting are also contemplated. A person of ordinary skill in the art will recognize that the disclosed embodiments are capable of being used in combination with a photo-mask, such as that used in standard lithography; however, a photo-mask need not be used in the disclosed method.

Figure 16:
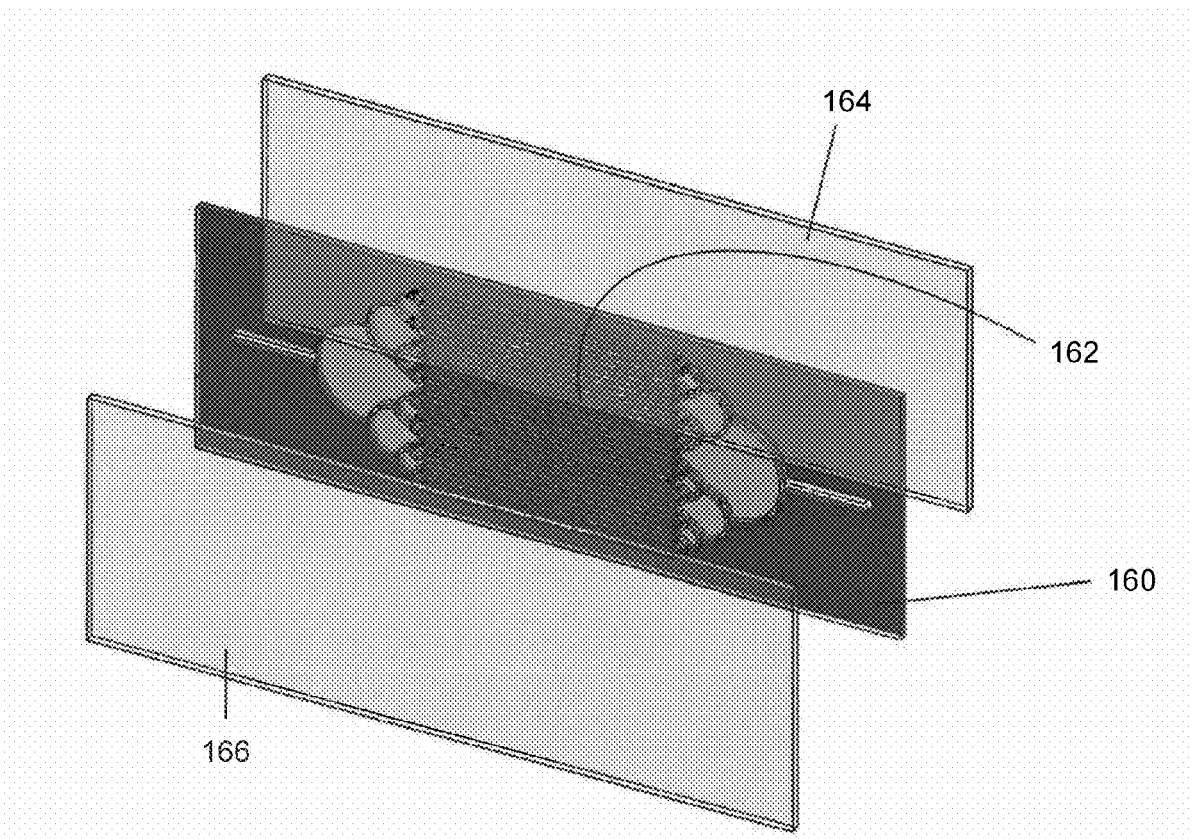
FIG. 16 is an image of a disclosed embodiment wherein a bonding agent-derived lamina comprising a plurality of microchannels is positioned to be coupled in between two polymeric sheets.
Figure 17:
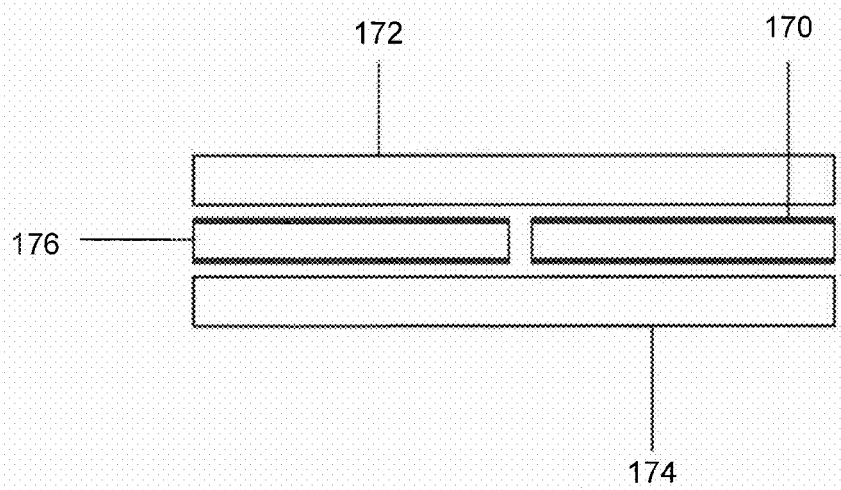
FIG. 17 is a cross sectional image of an embodiment similar to that disclosed in FIG. 16.

In particular embodiments, occlusion or deformation of the microchannels made in embodiments where the microchannel is defined in the bonding agent layer may be prevented by providing a thin film of the bonding agent on a hard polymer, such as PMMA, PC, PEI, PETE, PDMS, polyurethane, PETG, and PVC. According to FIG. 16, a bonding agent-coated microfluidic device component 160 may be patterned with a plurality of microchannels 162. The bonding agent-coated microfluidic device component 160 is then enclosed using a top layer 164 and bottom layer 166 of a capping material known to a person of ordinary skill in the art, such as plastic polymers (e.g. acrylic, polycarbonate, polyester). A person of ordinary skill in the art will recognize that the selection of the capping material will depend on the type of device being produced and the manner in which the device will be used. The assembly is heated at a temperature sufficient to melt, or substantially soften the bonding agent. In particular disclosed embodiments, the temperature may have any of the previously recited temperature ranges disclosed herein. In certain disclosed embodiments, the entire assembly may be pressed together using a pressure ranging from about 14 psi to about 200 psi; more typically from about 14 psi to about 100 psi; even more typically less than about 100 psi. Heating and pressing may occur simultaneously or sequentially. FIG. 17 is a schematic of the cross section of the assembly described in FIG. 16. The thick lines 170 represent the bonding agent, the top and bottom layers (172 and 174, respectively) represent the capping layers, and box 176 represents the sheet which is coated with the bonding agent 170.

In particular disclosed embodiments, the microchannels may be fabricated using a high resolution cutting plotter that is capable of producing features in the order of micron with great precision and accuracy. A person of ordinary skill in the art would recognize that the quality of the microchannel may depend on the attributes and mechanical resolution of the cutting tools. Disclosed embodiments illustrate that using a relatively inexpensive knife plotter can produce microchannels with good precision, such as approximately 2 μm microchannels. The disclosed method may also be used to simultaneously place a plurality of channels on a substrate by directly uploading multiple designs into a plotter drive to facilitate mass production. In certain disclosed embodiments, the bonding strength of the fabricated lamina is such that the fabricated lamina may withstand pressure exceeding about 1200 psi, more typically exceeding 1500 psi.

Figure 18:
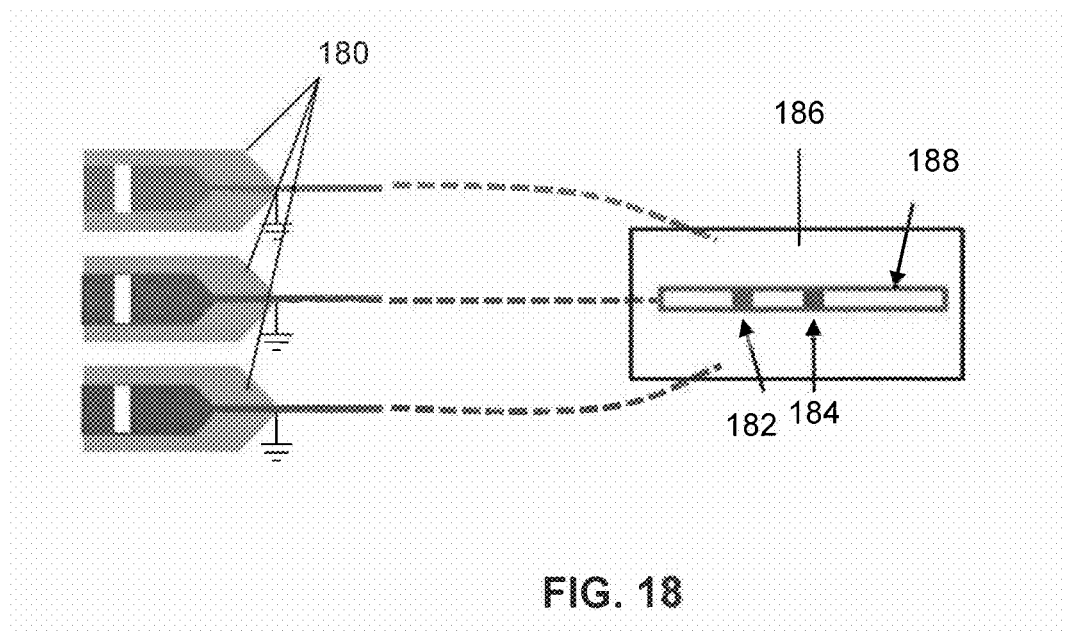
FIG. 18 is a schematic image of a disclosed embodiment wherein the bonding agent is dispensed by a liquid handler to define the channel and modify certain areas of a paper sample.

In other disclosed embodiments, the microchannels may be made using the bonding agent and a mechanical printing device, such as a jet printer, to define the channel patterns. In particular disclosed embodiments, microchannel patterns are first designed and drawn on a device capable of communicating with the mechanical printing device, such as a computer. The bonding agent may be dissolved in any solvent known to those of skill in the art to be capable of dissolving the bonding agent, such as halogenated solvents (e.g. chloroform, dichloromethane), heterocyclic solvents (e.g. 1,4-dioxane, tetrahydrofuran), ketone-containing solvents (e.g. methyl ethyl ketone), and combinations thereof. The solution of the bonding agent may then be loaded in a liquid handler capable of being used to create the microchannels, such as in a jet printer. The designs may be sent from the device capable of communicating with the mechanical printer to the printer, which contains the dissolved bonding agent. The bonding agent may be dispensed from the liquid handler to create the patterned channel. FIG. 18 is an illustration of a disclosed embodiment wherein the bonding agent may be contained in one or more liquid handlers 180. The bonding agent may be dispensed to define a channel 188 on a substrate 186, as well as to modify the channel 188 in various positions 182 and 184.

Figure 19:
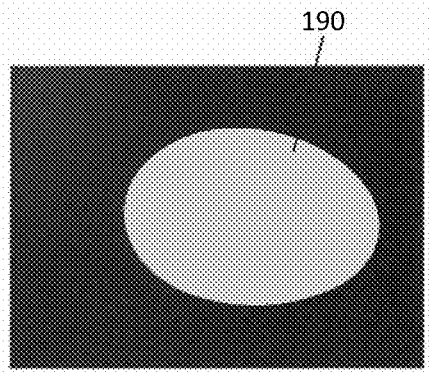
FIG. 19 is an optical image of a disclosed embodiment of a substrate suitable for being converted into a microfluidic device.
Figure 20:
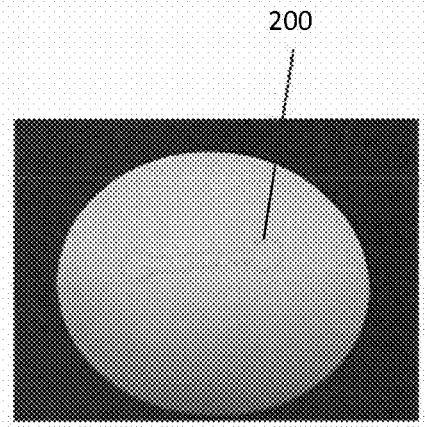
FIG. 20 is an optical image of a disclosed embodiment wherein a microchannel is patterned onto a substrate using the bonding agent to define the boundaries of the pattern.
Figure 21:
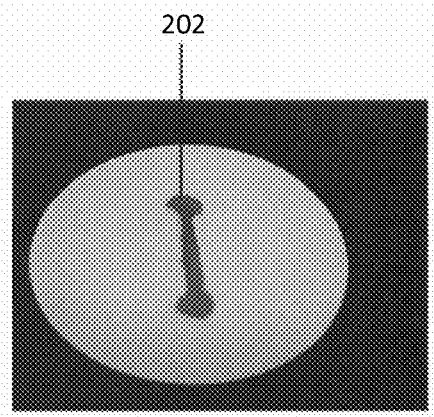
FIG. 21 is an optical image of a disclosed embodiment wherein a sample is introduced into the channel of a microfluidic device.

In other disclosed embodiments, a microfluidic device may comprise hydrophilic substrates, such as paper, which can be made to comprise one or more channels formed with the bonding agent. The channels can be patterned onto the hydrophilic substrate using a dissolved form of the bonding agent, wherein any solvent selected from those previously listed may be used. Patterning comprises using any method known to those skilled in the art, such as stamping, jetting, or combinations thereof. The dissolved bonding agent is used to define the outer limits of the channel. Without being limited to a particular theory of operation, it is currently believed that the fluidic channel will operate based on capillary action when a sample is applied on the hydrophilic substrate. A particular embodiment is illustrated in FIGS. 19-21 wherein a substrate 190 (FIG. 19) is patterned with the bonding agent to form a defined pattern 200 (FIG. 20), which may then be modified with a fluid and/or a solution to form a filled or modified channel 202 (FIG. 21), wherein the fluid is kept within the bonding agent-modified channel.

Figure 22:
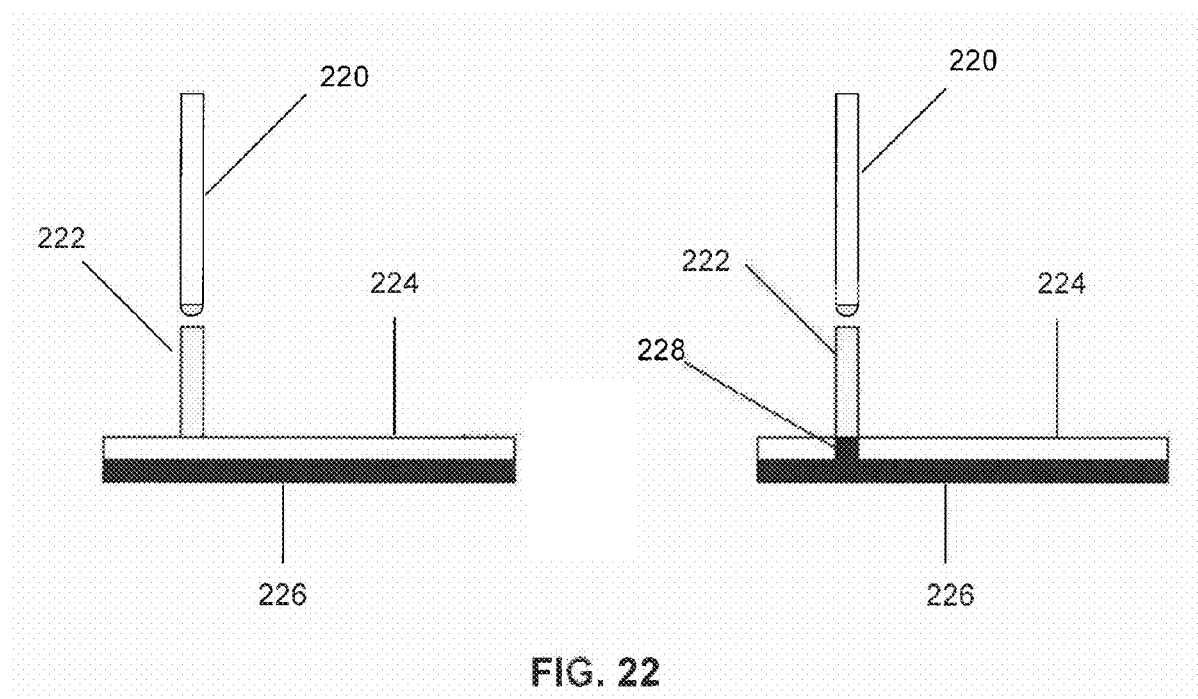
FIG. 22 is an image of a disclosed embodiment wherein a laser is used to cut a channel in a substrate to expose a backing comprising the disclosed bonding agent.
Figure 23:
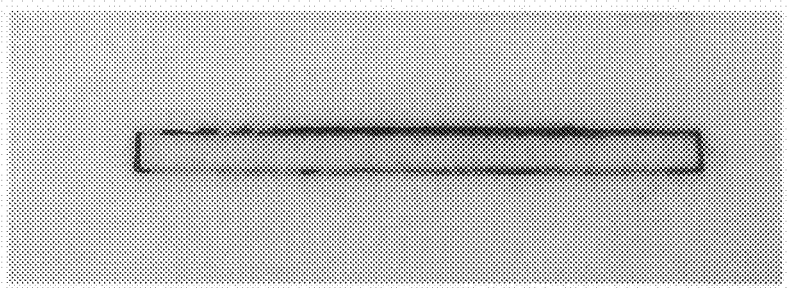
FIG. 23 is an optical image of a bonding agent-based paper microfluidic device wherein the channel is defined using the bonding agent and no sample has been added.
Figure 24:
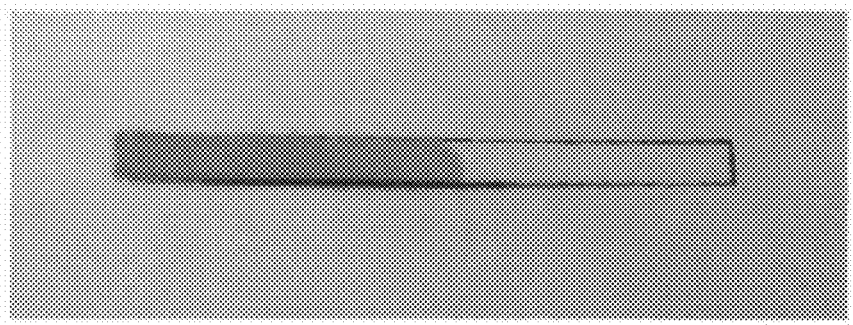
FIG. 24 is an optical image of the embodiment of FIG. 23 after a sample has been introduced.

Also contemplated by the disclosed method is fabricating bonding agent-based channels on paper by patterning the channels using an energy source, such as a laser trimmer or an IR laser pointer. Channel designs may be created using any method known to those skilled in the art, such as by stamping, jetting, or combinations thereof. The patterns may be directly applied with an energy source on a hydrophilic substance, such as paper, to which a layer of the bonding agent is coupled. Without being limited to a particular theory of operation, it is currently believed that the heat generated from the energy source consequently melts the bonding agent backing/layer, creating hydrophobic boundaries on the hydrophilic substance. The areas where the laser passes through the hydrophilic substance allows the bonding agent backing/layer to be exposed, thus the exposed portion will be substantially more hydrophobic than the areas of the hydrophilic substance that are not treated with the energy source. FIG. 22 illustrates a particular disclosed embodiment wherein a laser 220 provides a laser beam 222, which is focused on a paper substrate 224 comprising a PCL backing layer 226. The laser beam cuts through the paper and simultaneously melts the PCL backing to define a channel 228. FIGS. 23 and 24 illustrate a disclosed working embodiment wherein the channel has been define (FIG. 23) and then a sample is introduced and stays within the PCL defined channel (FIG. 24).

V. Method of Using the Disclosed Microfluidic Device

Disclosed herein are embodiments of a method for using a microfluidic device comprising the bonding agent. The bonding agent may be used to couple one or more components of the microfluidic device, or the device may be made substantially out of the bonding agent. In particular embodiments, the disclosed microfluidic device may be used to purify and/or separate one or more components capable of being analyzed with the device, such as in a dialysis system. In disclosed embodiments, the microfluidic device may be used to purify a particular compound or component of interest. In certain disclosed embodiments, the device may be used to purify nanocrystals, such as cellulose nanocrystals. In other disclosed embodiments, the device may be used to quantify a compound or component, such as using the device to quantify thrombin levels in a subject. Particular disclosed embodiments concern using the disclosed microfluidic device as a point of care diagnostic system, or in combination with another device to be used as a point of care diagnostic system. The disclosed microfluidic device may also be used for lateral flow analysis and enzyme immunoassays, such as an enzyme-linked immunosorbent assay (ELISA).

VI. Use of the Disclosed Bonding Agent in Biological Applications

In particular disclosed embodiments, the bonding agent may be used as a film that serves as an intermediate layer between a surface and a second substance, such as one or more biomolecules or small compounds.

A. Direct Casting of Bonding Agent Film

In particular disclosed embodiments, the bonding agent may be biocompatible and suitable for various bioanalytical applications. Certain disclosed embodiments concern using compositions comprising the bonding agent in combination with other molecules or compounds of interest having functional groups capable of coupling with the bonding agent. In disclosed embodiments, the bonding agent may be combined with one or more biomolecules or small molecules to form a film capable of retaining all of the properties possessed by each of the materials used to make the composition. The film may be used alone or in combination with another substrate to which the film is attached. Particular disclosed substrates include polymeric materials, biosensors (e.g. nanowires and nanotubes), well plates (e.g. microwells), and lamina.

In certain disclosed embodiments, direct casting of the composition is carried out in a one-step application. Particular disclosed embodiments concern creating a layer of the bonding agent, which may or may not be coupled with one or more compounds, on a surface of a substrate without long incubation periods and time-consuming washing processes. In particular disclosed embodiments, at least one molecule of interest, such as a biomolecule or small molecule, is added to a solution comprising the bonding agent and a solvent capable of dissolving the bonding agent. Particular disclosed embodiments concern using the solvents already disclosed herein. The composition comprising the bonding agent and the at least one molecule of interest may be readily applied to a substrate using a suitable method. A person of ordinary skill in the art will recognize that the type of application method will depend on the substrate to which the composition is added. In particular disclosed embodiments, the composition may be added by hand casting or by using a liquid handler/spotter for mechanical control. Particular disclosed embodiments concern using a jet printer to cast the composition. In certain disclosed embodiments, direct casting is used to manipulate different areas of a particular substrate, such as by modifying the substrate with various different biomolecules and/or small molecules wherein they are coupled with the substrate through the bonding agent. In particular disclosed embodiments, the amount of reactive groups present in the bonding agent, whether unmodified or modified as disclosed previously, can be varied by adjusting the concentration of the solution.

B. Method of using the Bonding Agent Film

In particular embodiments, the bonding agent film may be used as an activation layer to introduce functional groups on the surface of a substrate, which may then be further modified. Particular disclosed embodiments concern using compounds comprising one or more nucleophilic moieties, such as, but not limited to, an amine, a hydroxyl, a sulfhydryl, a phosphoryl, and anions derived therefrom, in combination with the bonding agent. The nucleophilic moieties are typically capable of being coupled with a molecule comprising one or more electrophilic sites and/or functional groups, such as a biomolecule. In particular disclosed embodiments, the biomolecule may be selected from an enzyme, protein, nucleic acid, and/or a carbohydrate (e.g. saccharide, disaccharide, or polysaccharide). The bonding agent serves to couple one or more of the electrophilic molecules to a substrate's surface. A person of ordinary skill in the art will recognize that the bonding agent may also be coupled with a compound comprising an electrophilic moiety suitable for reacting with, for example, a biomolecule comprising a nucleophilic moiety. Particular disclosed embodiments concern compositions comprising polycaprolactone and one or more primary amines, such as diethylamine.

In particular disclosed embodiments the bonding agent can also be used to improve hydrophilicity of disclosed embodiments of the film comprising the bonding agent-coupled compound in order to prevent unwanted adsorption of certain compounds, such as proteins. Polymers suitable for combination with disclosed embodiments of the bonding agent include, but are not limited to, polyethylene glycol (PEG) and chitosan, which may be coupled with the bonding agent to produce a uniform layer of film with improved hydrophilic properties to resist protein adsorption. In certain disclosed embodiments, the disclosed film may also provide functional groups suitable for coupling with a molecule of interest, such as a biomolecule or small molecules, in subsequent analyses. When non-specific protein adsorption is prevented using disclosed embodiments of the bonding agent film, specific detection of desired biomolecules or small molecules can be carried out.

1. Bonding Agent as a Coating for Biosensors

In particular disclosed embodiments, a biosensor may be coated and/or modified with disclosed embodiments of the bonding agent. In certain embodiments, the surface of a biosensor (e.g. a transducer) may be coated with a bonding agent comprising one or more functional groups bearing receptors that specifically bind to or couple with a target analyte. In other disclosed embodiments, the surface of a biosensor may be coated with the bonding agent and further modified to comprise functional groups bearing receptors that specifically bind to or couple with a target analyte. In particular disclosed embodiments, the biosensor's surface need not be chemically altered in order for target analytes to bind and/or couple. The bonding agent may be compatible with the biosensor's surface such that the two may be coupled without further chemical and/or physical modification. In addition, the thickness of the bonding agent film can be adjusted and optimized as desired.

Figure 25:
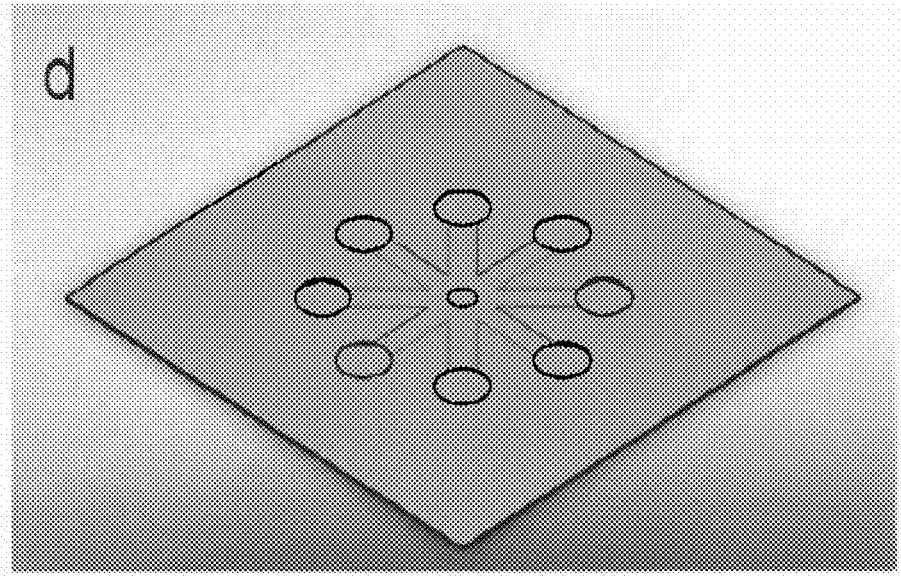
FIG. 25 is an image of a disclosed embodiment of a biosensor comprising the disclosed bonding agent.
Figure 26:
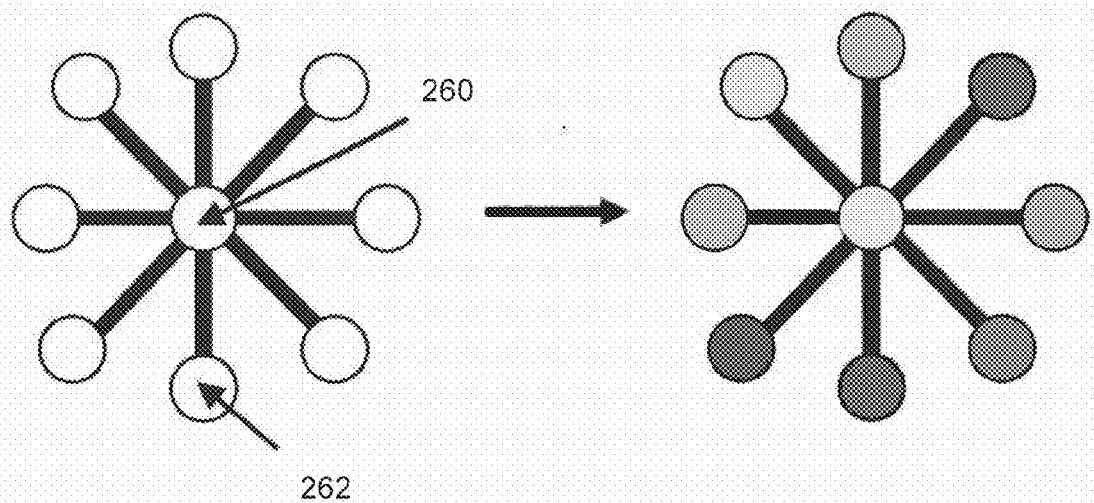
FIG. 26 is an image of a disclosed embodiment of a biosensor comprising a sample well connected to a plurality of reaction chambers via channels. When a sample is introduced, a colorimetric change occurs in the reaction chambers.

In particular disclosed embodiments, the disclosed bonding agent may be used in colorimetric detection of various metal ions. In some disclosed embodiments, the bonding agent comprises one or more ligand molecules capable of binding a target metal ion. In particular disclosed embodiments, the ligand molecule may be selected to bind a specific target metal ion. Particular disclosed embodiments concern detecting metal ions selected from ions of Hg, Li, Na, K, Mg, Ca, Sr, Ba, Mn, Fe, Co, Ni, Cu, Zn, Pt, Cd, Pb, Cr, Fe, Ag, Au, Pd, and combinations thereof. The concentration of the particular metal ion can be determined colorimetrically from the color change that occurs during bonding agent-ligand-metal ion complex formation. Particular disclosed embodiments may be used to produce a colorimetric response for both qualitative and quantitative measurements. Particular disclosed embodiments may concern a disposable metal ion sensor that detects the presence of multiple metal ions by forming complexes (as evidenced by a color change) with one or more ligands bound to the bonding agent in multiple different chambers. An example of such an embodiment is illustrated in FIG. 25, which is an image of a disclosed embodiment of a biosensor. FIG. 26 illustrates a particular embodiment of a biosensor device wherein a sample may be added to the center well 260 of the biosensor. The sample may flow through any one of the illustrated channels to various different or same reaction chambers 262. The bonding agent may be used to define the channels and may also be used to construct the biosensor sections, such as lining the sample well and the reaction chambers.

2. Bonding Agent Membranes

Figure 27:
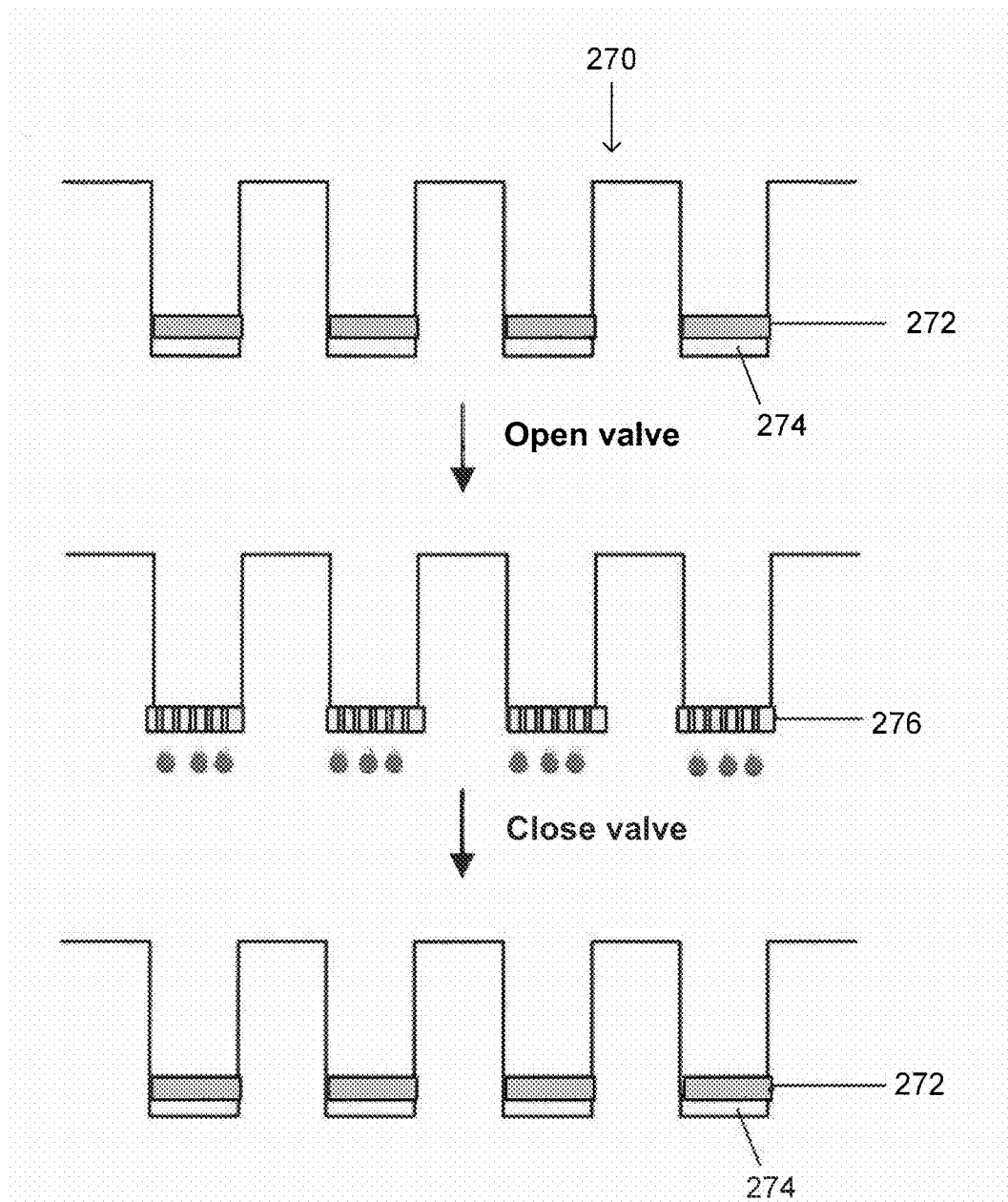
FIG. 27 is an image of a disclosed embodiment wherein the bonding agent is used in a controllable-base well plate.

In particular disclosed embodiments, the bonding agent may be combined with one or more other molecules in order to provide composition for use as a membrane capable of activation and/or passivation in a microwell plate's base. In particular disclosed embodiments, the bonding agent may be used to control the flow of liquids through the wells, such as by acting as a valve. In certain embodiments, the bonding agent may be coupled with a photoactivatable compound to provide a membrane suitable for activation/passivation induced by light. In particular disclosed embodiments, spiropyran may be coupled with the bonding agent to provide a film that is photoactivatable when irradiated with UV/Vis light. The use of spiropyrans in combination with polymeric materials is disclosed in U.S. patent application Ser. No. 13/068,215, which is herein incorporated by reference. Other valving mechanisms are contemplated in the disclosed apparatus, such as controllable gel swelling, electrowetting, and the collapsing/reconstructed nanostructures as materials in the microplate base. A particular disclosed embodiment is illustrated in FIG. 27. According to FIG. 27, a well plate 270 comprising a liquid 272 contained above a bonding agent composition 274, which is hydrophobic, may be constructed. After inducing a chemical change in the bonding agent composition, such as isomerizing, tautomerizing, or ionizing, one or more components of the bonding agent solution may convert from being hydrophobic to being hydrophilic, at which point the liquid may pass through the membrane. The bonding agent may then be converted back to its hydrophobic state, at which point the liquid will stop flowing through the membrane.

In certain disclosed embodiments, a plurality of layers of bonding agent membranes may be made using an electrostatic self-assembly method. Electrostatic assembly can be used in making well-defined surfaces. In particular disclosed embodiments, the bonding agent, modified or unmodified, may be a component of a plurality of polymer layers, such as lamina or membranes, which are assembled by electrostatic interactions.

VII. Working Embodiments

Example 1

This working embodiment concerns coating various polymer substrates with a thin film of polycaprolactone (PCL). The coating process can be accomplished through spin coating, spraying, dipping, or heat pressing, depending on the desired final PCL layer thickness and the microchip application. The PCL solution was made by dissolving bulk PCL pellets (Sigma Aldrich, St. Louis, Mo., 63103) in an organic solvent, such as chloroform. A thinner PCL film can be obtained by further dilution of the PCL using more organic solvent.

Before cutting, both sides of the polymer sheet (such as PMMA or PC) were coated with PCL film. The thinnest polymer sheet used in this work was PC and had a thickness of 50 µm. Both sides of the PC sheet were coated with PCL film of 1-3 µm. The microchannels were directly produced by cutting the PCL-coated sheet using a high resolution knife plotter Flatbed FC2250 (Graphtec America, Santa Ana, Calif., USA). A complete microchannel was formed by capping the open channel with a top and bottom polymer piece (such as PMMA, PC, PS, or PETE). After the individual layers were assembled, complete bonding was carried out in a thermal press (Fred S. Carver Inc., Summit, N.J.) with minimal pressure (100 psi or less) at 60° C.

In particular disclosed embodiments, the thickness of the microchannel is mainly governed by the thickness of the PC sheet, but the PCL film will add slightly to the channel's thickness. Therefore, the PCL film was made to be as thin as possible to minimize its contribution to the final channel dimension. At elevated temperatures, only the PCL layers are "heat-activated" for sealing. The main channel can be preserved since it was made out of a PC layer (Tg~150° C.) with a glass transition temperature well above the bonding temperature.

Figure 28:
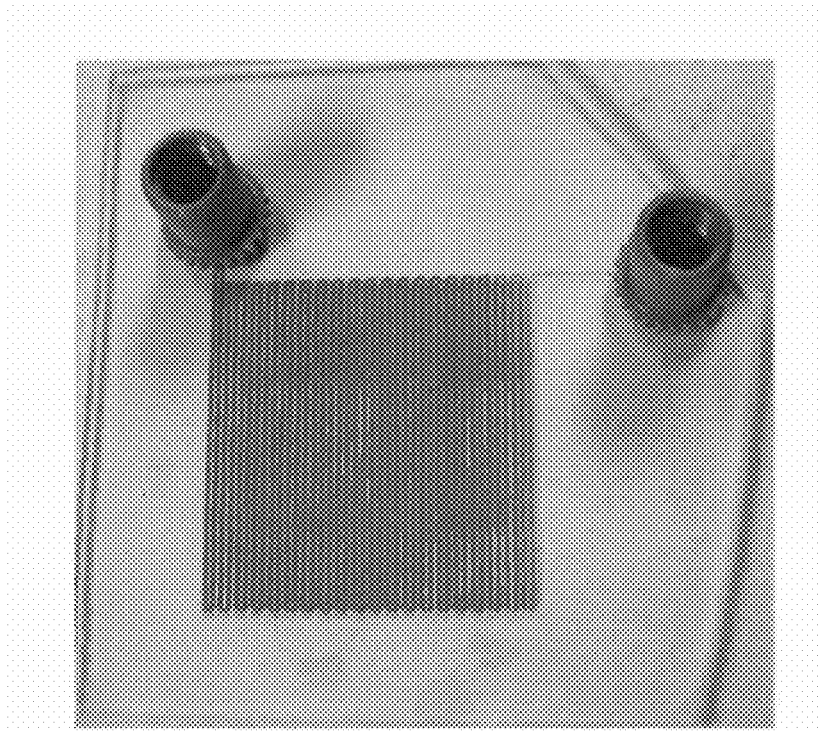
FIG. 28 is an optical image of a disclosed embodiment of a microfluidic device comprising the disclosed bonding agent wherein fluid is passed through the channels and no leaks are detected.
Figure 29:
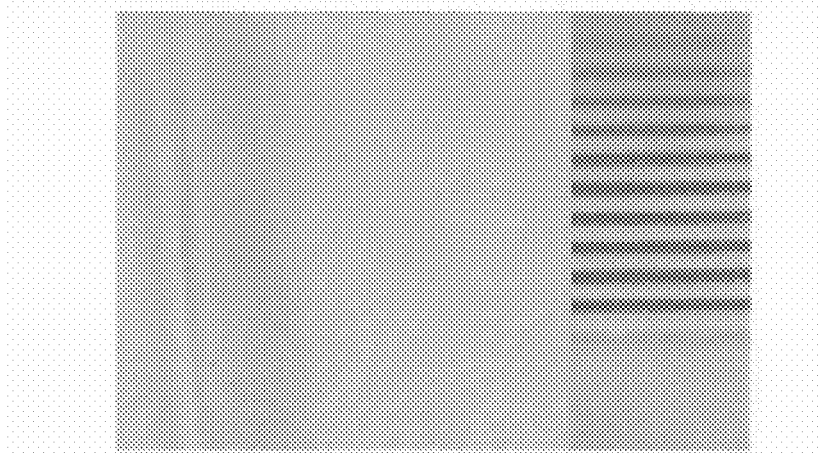
FIG. 29 is an expanded view of an optical image of the disclosed embodiment of FIG. 28.
Figure 30:
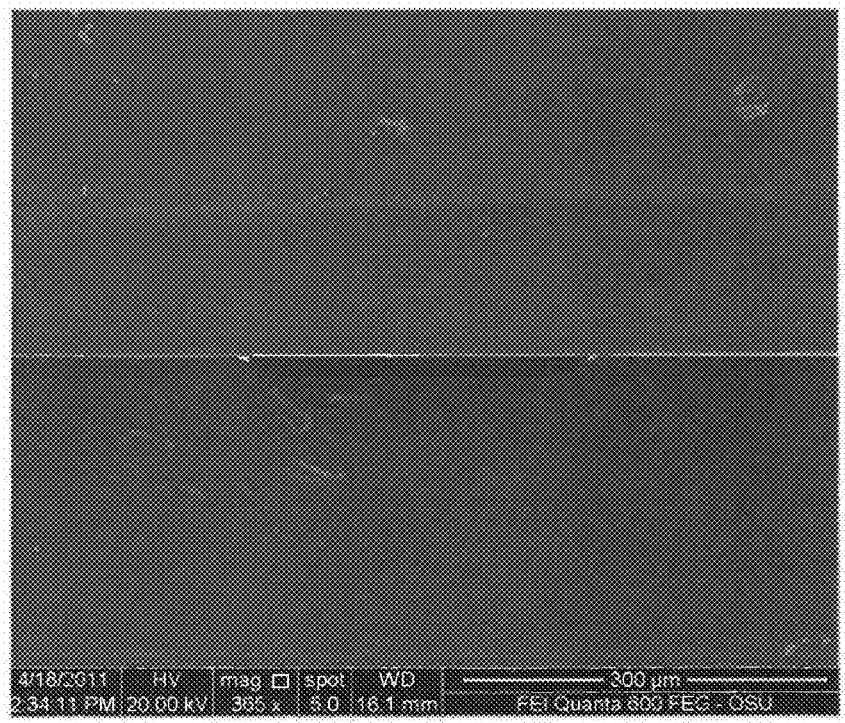
FIG. 30 is an optical image obtained from a scanning electron microscope (SEM) of a disclosed embodiment showing the microchannel cross section.

Success of the bonding technique was evaluated using blue dye, as shown in FIGS. 28 and 29, to examine for any leaks resulting from incomplete bonding. Results confirmed that no leaks were observed in the microchannels. The fabrication process was repeated 30 times for each microchip with different designs and dimensions to demonstrate the reproducibility of the technique. All chips were leak-free when tested using the dye. The working pressure was tested with a high pressure syringe pump, and the device withstood pressures exceeding 1500 psi without any signs of leakage or failure. The bonding process was evaluated by assessing the dimensions and structures of the fabricated microchips. The cross sections of the microchannels were examined under an SEM microscope as illustrated in FIG. 30. The results show that the channels' structures were maintained using PCL as the bonding media.

Example 2

In this working embodiment, a channel was fabricated with laser ablation on various polymer substrates. All patterning was done with a 5 watt, 355 nm UV laser ESI 5330 uVIA Drill designed for mico-machining (ESI, Portland, Oreg., 97229). In order to directly pattern the channels, the laser output was focused on the polymer surface. The polymer was held down by vacuum on a two-dimensional stage where it moves relative to a fixed laser beam according to the programmed patterns. The direct write method was used to create channels on various polymer substrates, such as PC, PEI, and PETE (McMaster-Carr, Princeton, N.J., 08543).

The bonding process was carried out using PCL-coated polymers to cap the previously fabricated channels. The PCL solution was made by dissolving bulk PCL pellets (Sigma Aldrich, St. Louis, Mo., 63103) in an organic solvent such as chloroform. The complete microchannel was formed by capping the open channel with the PCL-coated polymer. After the individual layers were assembled, complete bonding was carried out in a thermal press (Fred S. Carver Inc., Summit, N.J.) with minimal pressure (100 psi or less) at 60° C.

PCL can also be used as a capping material for microchannels that are produced with methods other than laser ablation. A PMMA microchannel was produced via hot embossing and laminated using PCL-coated PMMA. A blank PMMA sheet was coated with a PCL layer, either by spin coating or by heat-pressing the PCL film on its surface. The PCL-coated PMMA was positioned facing the open channel. Next, the whole assembly was heated to 60° C. with minimal pressure (pressure form a clamp is sufficient) until it had completely bonded. Bonding occurred when the PCL layer was "heat-activated," and the process was completed as the temperature dropped below 60° C.

The microfeatures were inspected with an optical microscope, and channel dimensions were measured using a profilometer (Dektak surface profile measuring system, Veeco Instrument Inc., Santa Barbara, Calif.). The microchip was frozen with liquid nitrogen and fractured to obtain cross-sectional images of the microchip. Morphology of the PCL-bonded microchip was studied using an Amray (Bedford, Mass.) scanning electron microscope (SEM) operated at 10 kV.

Figure 31:
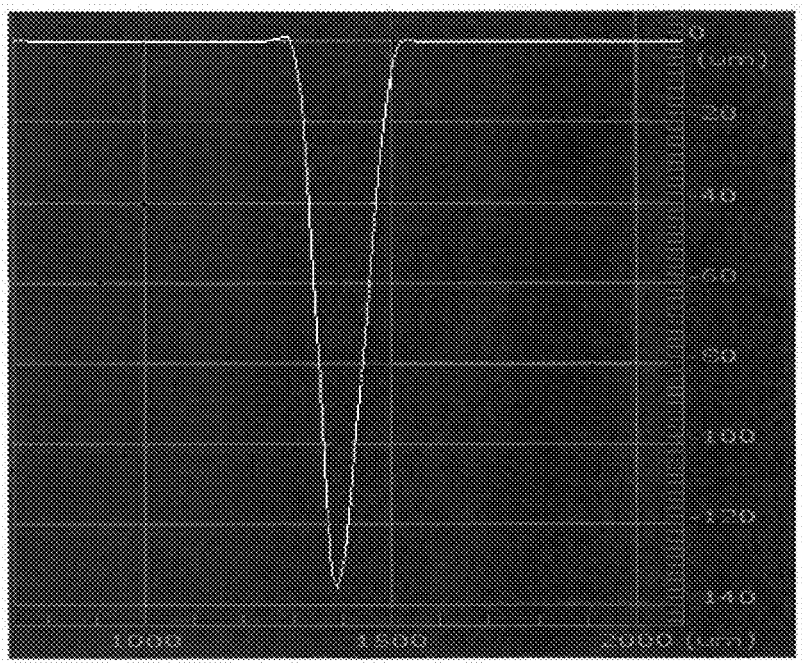
FIG. 31 is an optical image of a profile trace of a laser ablated microchannel formed in a disclosed embodiment using PEI as a polymeric material.
Figure 32:
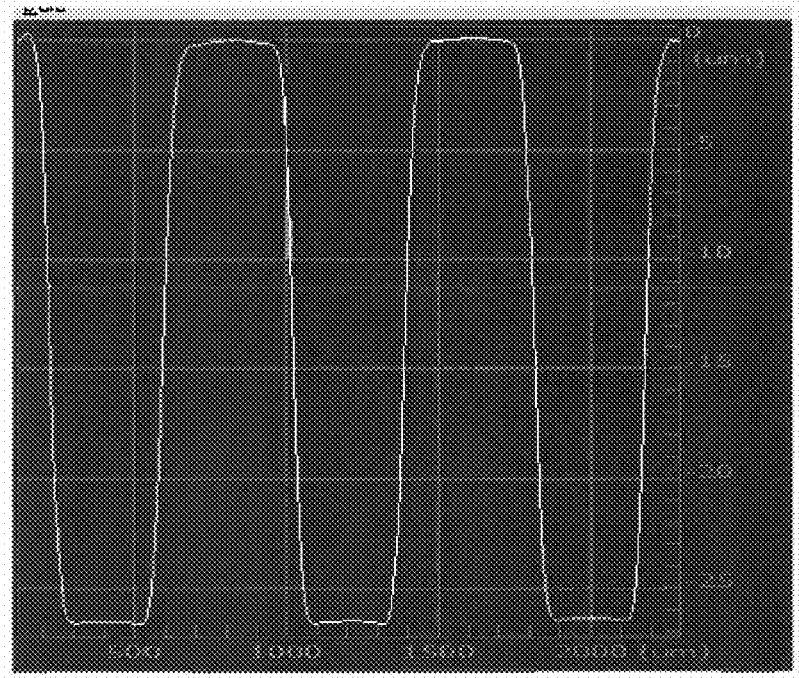
FIG. 32 is an optical image of a profile trace of a laser ablated microchannel formed in a disclosed embodiment using PMMA as a polymeric material.

The laser ablated microchannels were produced on the PEI substrate, while the hot embossed channels were created on PMMA. FIG. 31 shows the profile of the PEI channel with dimension of ~200 μm and 140 μm for the channel width (W) and depth (D), respectively. This profile was compared with with the embossed PMMA channels (FIG. 32) with dimensions of ~400 μm (W) and 25 μm (D). Both chips were sealed using the same PCL bonding protocol.

The bonding process was evaluated by assessing the dimensions and structures of the fabricated microchips. The cross sections of the microchannels were examined under a microscope, as illustrated in FIG. 30. The SEM image shows the cross section of a PMMA microchannel sealed with a PCL-coated PC sheet. The results show that the channels' structures were maintained (dimensions: ~200 μm wide×25 μm deep) using the PCL as bonding media. And as can be seen from the image, the channel was successfully obtained without evidence of channel deformation or clogging. The PCL layer is designed to have minimal effect on the final channel dimension. This is accomplished by manufacturing the PCL layer preferably to be as thin as possible. We have been able to produce PCL films as thin as 1 μm through various coating procedures. The effect of the PCL layer on the final channel dimension is less as the channel depth gets larger. For a 100 μm deep channel, a 1 μm PCL film might alter the channel by resulting in a 0.7% decrease in its final depth. While in a 25 μm channel, it will result in a 4% decrease in its final depth.

Example 3

This working embodiment concerns using PCL as an adhesive to bond interconnect ports onto microchip reservoirs. A PCL film was sandwiched in between a microfluidic chip reservoir and a connection port for bonding. Next, bonding was performed at 60° C., at which point the PCL layer turns clear, indicating that the melting temperature of the polymer had been reached. The bonding process was completed as soon as the temperature dropped below 60° C., as the PCL layer turned opaque.

The NanoPort was purchased from IDEX (Oak Harbor, Wash., 98277), and the standard plastic connectors were machined in our lab to investigate the utility of the PCL tape as bonding material on various types of plastics. The fabricated port allowed for a standard ferruled connector to be attached to the microfluidic device. It contained a threaded portion for the fitting and a fluid path with small port on the bottom for the interface. The port was manufactured using 0.25 inch plastic piece and machined to size using a knee mill. The threaded port was drilled with a #21 drill bit, then tapped with a 10-32 bottoming tap. The fluid paths were drilled using a 1 mm drill bit (substitute any drill to achieve the desired internal volume).

The working pressure of these ports was tested with a syringe pump, and withstood pressures in excess of 1500 psi without any signs of leakage or failure. The machined PMMA and PC ports were developed to allow for standard compression tubing connectors, such as those available from IDEX to be interfaced with microfluidic chips.

Example 4

In this working embodiment, an interconnect using polycaprolactone (PCL) as the adhesive to bond ports onto microchip reservoirs is disclosed. A thin PCL adhesive layer was produced by compressing the bulk PCL in a heated press. To activate the PCL layer, 3M copper electrical tape (SPI Supplies, West Chester, Pa.) was used to distribute the heat across the PCL layer. The copper tape was a double sided tape, which was sandwiched in between two thin PCL layers as shown in FIG. 3. Bonding was performed at 60° C. by compressing the end of the copper tape using a heated press until the PCL layer was activated and turned clear. Next, the PCL-coated tape was placed in between the microfluidic chip reservoir and a connection port for bonding as shown in FIG. 3. The bonding process was complete as soon as the temperature dropped below 60° C.

Example 5

Figure 33:
FIG. 33 is an optical image of a disclosed embodiment wherein the disclosed bonding agent is used to make a film suitable for coupling, for example, one or more amines.
Figure 34:
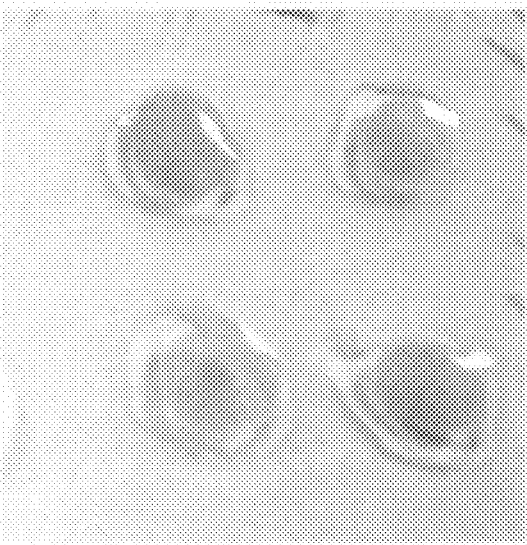
FIG. 34 is an optical image of the disclosed film displayed in FIG. 33 after a primary amine has been added and the disclosed film turns blue.
Figure 35:
FIG. 35 is an optical image obtained from a working embodiment wherein fluorescence is used to detect the coupling between a bonding agent and a primary amine, where a control sample comprises only the disclosed bonding agent and does not produce a fluorescence signal. By comparison, the samples comprising the disclosed bonding agent and a primary amine do produce fluorescence signals.

Polycaprolactone blends were added directly to the surface of a polymer substrate for biological assays. The presence of amines in the PCL film was detected using a colorimetric reaction. The first assay was based on the color change of Coomassie Blue from brown to blue in PCL films in the presence of amines (FIG. 33 illustrates the assay before coupling the amines, and FIG. 34 illustrates the assay after coupling). The next assay that was performed was fluorescence-based detection of PCL in the presence of primary amines. Successful binding of the primary amines to the PCL was indicated by an intense fluorescence signal observed under a fluorescent microscope (FIG. 35).

To demonstrate the utility of PCL in creating thin films suitable for coupling biomolecules, PCL and diethylamine, which contains primary amines, a film was cast on a PMMA piece as a thin film. The primary amines of diethylamine provide sites to link potential biomolecules. The accessibility of the amines in the PCL/diethylamine film was accessed by treating the film with the reagent Coomassie Blue, which turns from a brown color to blue in the presence of amines. As shown in FIG. 34, the PCL film containing diethylamine turned blue when treated with Coomassie Blue, while the control without diethylamine remained unchanged in the presence of Coomassie Blue. These results indicate that PCL films can successfully be casted with amine containing compounds, and that they are chemically available for further modification or attachment of biomolecules, for use in detection, quantification and other analyses.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A microfluidic device for transporting one or more fluids, comprising:
a first substrate substantially coated or fabricated with a bonding agent having a formula

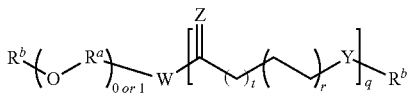

where Z, Y, and W independently are O; $R^a$ is aliphatic; each $R^b$ independently is selected from hydrogen, aliphatic, or heteroaliphatic; r is from 1 to 4; ranges from 0 to about 4; and q ranges from at least 1 to about 1000;
a second substrate substantially coated or fabricated with the bonding agent and comprising at least one patterned microchannel or nanochannel having at least a width and length defined by the bonding agent, wherein the at least one patterned channel transports the one or more fluids through the microfluidic device;
a third substrate substantially coated or fabricated with the bonding agent; and
at least one inlet port and outlet port fluidly coupled by the bonding agent to the first substrate, the second substrate, and the third substrate, wherein the at least one inlet port introduces the one or more fluids into the microfluidic device and the at least one outlet port delivers the one or more fluids from the microfluidic device.

2. The microfluidic device of claim 1 where the bonding agent has a formula

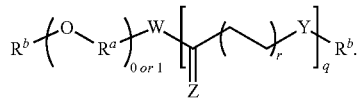

3. The microfluidic device of claim 1 where the bonding agent has a formula

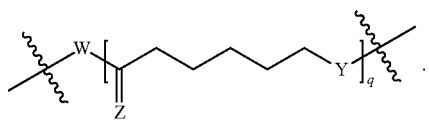

4. The microfluidic device of claim 1 where the bonding agent is selected from polycaprolactone, polycaprolactone diol, polycaprolactone triol, polycaprolactone-block-polytetrahydrofuran-block polycaprolactone, poly(ethylene oxide)-block-polycaprolactone, poly(ethylene glycol)-block-poly(e-caprolactone) methyl ether, and combinations thereof.

5. The microfluidic device of claim 1 where the bonding agent is applied as a thin film or a solution.

6. The microfluidic device of claim 1 where the second substrate comprises at least one patterned microchannel wherein the width defined by the bonding agent ranges from about 100 μm to at least about 500 μm and the length defined by the bonding agent is up to 10 mm, and further having a depth ranging from 35 μm to about 160 μm.

7. The microfluidic device of claim 1, further comprising a plurality of operatively associated substrates between the first substrate and the third substrate, wherein each of the operatively associated substrates is substantially coated or fabricated with the bonding agent.

8. The microfluidic device of claim 5 where the thin film has a thickness ranging from 1 μm to about 1 mm.

9. The microfluidic device of claim 1 where the first substrate, the second substrate, or the third substrate is a lamina or a microchip comprising an organic polymer.

10. The microfluidic device of claim 1, wherein the bonding agent is selected from

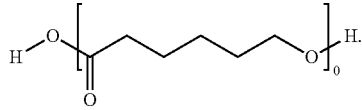

11. The microfluidic device of claim 1, wherein the bonding agent is polycaprolactone, and the device is an in vivo microfluidic device.

12. The microfluidic device of claim 5 where the thin film has a thickness ranging from about 50 μm to about 300 μm.

13. The microfluidic device of claim 5 where the thin film has a thickness ranging from about 100 μm to about 200 μm.

14. The microfluidic device of claim 7, wherein the device is capable of transporting two fluids through the operatively associated substrates without mixing.

15. A method for making the microfluidic device of claim 1, comprising:
providing a first substrate, a second substrate, and a third substrate;
providing the bonding agent
applying the bonding agent to each of the first substrate, second substrate, and the third substrate so that the bonding agent substantially coats or fills the first substrate, the second substrate, and the third substrate;
forming a microchannel or a nanochannel in the second substrate using a laser or manual cutting device wherein the bonding agent defines at least the width and the length of the microchannel or the nanochannel;
coupling the first substrate, second substrate, and third substrate by stacking the first substrate, second substrate, and third substrate and heating the bonding agent; and
coupling the at least one inlet port and outlet port to the first substrate or the third substrate using a thin film or solution of the bonding agent.

16. The method of claim 15 where the second substrate comprises at least one microchannel wherein the width defined by the bonding agent ranges from about 100 μm to at least about 500 μm and the length defined by the bonding agent ranges from greater than 0 mm to about 10 mm, and further having a depth ranging from 35 μm to about 160 m and the microchannel is formed prior to coupling the first substrate, second substrate, and third substrate.

17. The method of claim 15 where coupling comprises substantially coating the first substrate, the second substrate, and the third substrate with a thin film of the bonding agent.

18. The method of claim 17 where the thin film is formed on the first substrate, the second substrate, and the third substrate by spin coating, spraying, rolling, dipping, or heat pressing.

19. The method of claim 17 where the thin film is a preformed thin film, which is added to the first substrate, the second substrate, and the third substrate.

20. The method of claim 15 where the bonding agent is heated at a temperature ranging from about 50° C. to about 70° C.

\* \* \* \* \*